US011995317B2

(12) United States Patent
Hu et al.

(10) Patent No.: US 11,995,317 B2
(45) Date of Patent: May 28, 2024

(54) METHOD AND APPARATUS FOR ADJUSTING MEMORY CONFIGURATION PARAMETER

(71) Applicant: HONOR DEVICE CO., LTD., Shenzhen (CN)

(72) Inventors: Yang Hu, Shenzhen (CN); Xiaofeng Yuan, Shenzhen (CN); Xiang Luo, Shenzhen (CN); Zhiwei Li, Shenzhen (CN); Zefei Dou, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 0 days.

(21) Appl. No.: 17/924,287

(22) PCT Filed: Sep. 7, 2021

(86) PCT No.: PCT/CN2021/116838
§ 371 (c)(1),
(2) Date: Nov. 9, 2022

(87) PCT Pub. No.: WO2022/052897
PCT Pub. Date: Mar. 17, 2022

(65) Prior Publication Data
US 2023/0195309 A1 Jun. 22, 2023

(30) Foreign Application Priority Data

Sep. 10, 2020 (CN) .......................... 202010949797.5
Dec. 25, 2020 (CN) .......................... 202011574300.2

(51) Int. Cl.
*G06F 3/06* (2006.01)

(52) U.S. Cl.
CPC .......... *G06F 3/0604* (2013.01); *G06F 3/0632* (2013.01); *G06F 3/0653* (2013.01); *G06F 3/0673* (2013.01)

(58) Field of Classification Search
None
See application file for complete search history.

(56) References Cited

U.S. PATENT DOCUMENTS

| 10,635,337 | B2 | 4/2020 | Apparao et al. |
| 11,099,900 | B2 | 8/2021 | Yang et al. |

(Continued)

FOREIGN PATENT DOCUMENTS

| CN | 106557436 A | 4/2017 |
| CN | 107704290 A | 2/2018 |

(Continued)

OTHER PUBLICATIONS

Nakazawa Rina et al;"Taming Performance Degradation of Containers in the Case of Extreme Memory Overcommitment";2017 IEEE 10th International Conference on Cloud Computing (CLOUD) ,IEEE; Jun. 25, 2017;9Pages.

(Continued)

*Primary Examiner* — Kevin Verbrugge
(74) *Attorney, Agent, or Firm* — WOMBLE BOND DICKINSON (US) LLP

(57) ABSTRACT

This application provides a method and an apparatus for adjusting a memory configuration parameter. The method includes: obtaining a plurality of pieces of resource pressure, where the plurality of pieces of resource pressure are used to indicate a plurality of requirements for memory compression; and adjusting a memory configuration parameter based on the plurality of pieces of resource pressure, where there is a preset correspondence between the memory configuration parameter and each of the plurality of pieces of resource pressure. The resource pressure is, for example, processor pressure, I/O pressure, memory reclaim pressure, or memory swap space pressure. Memory compression requirements corresponding to different types of resource pressure are different. In the memory adjustment method provided in this (Continued)

application, a plurality of types of information are comprehensively considered, so that system performance can be optimized, and a memory management effect can be improved.

19 Claims, 9 Drawing Sheets

(56) References Cited

U.S. PATENT DOCUMENTS

| | | |
|---|---|---|
| 2004/0030813 A1 | 2/2004 | Benveniste et al. |
| 2014/0258670 A1 | 9/2014 | Venkatasubramanian et al. |
| 2016/0253262 A1 | 9/2016 | Nadgowda |
| 2016/0253263 A1 | 9/2016 | Takada |
| 2017/0322745 A1 | 11/2017 | Nakashima |
| 2018/0109469 A1 | 4/2018 | Nakazawa et al. |
| 2022/0121495 A1 | 4/2022 | Zhou |

FOREIGN PATENT DOCUMENTS

| | | |
|---|---|---|
| CN | 109144714 A | 1/2019 |
| CN | 109313604 A | 2/2019 |
| CN | 110704189 A | 1/2020 |
| CN | 110727606 A | 1/2020 |
| CN | 110764906 A | 2/2020 |
| CN | 111382087 A | 7/2020 |
| CN | 111581119 A | 8/2020 |
| CN | 111615207 A | 9/2020 |
| WO | 2018059076 A1 | 4/2018 |

OTHER PUBLICATIONS

Chen Wei et al;"OS-Augmented Oversubscription of Opportunistic Memory with a User-Assisted OOM Killer";Dec. 9, 2019;13pages.

Liu RuiKai et al.; "Memory Optimization Strategy Based on Deduplication Under Memory Overload";Journal of Chinese Computer Systems;Jun. 15, 2016;7 pages (with English abstract).

Rina Nakazawa et al.; "Taming Performance Degradation of Containers in the Case of Extreme Memory Overcommitment";2017 IEEE 10th International Conference on Cloud Computing; Nov. 11, 2017;9 pages.

Han Gaoshuai et al.;"Virtual machine memory management system based on cloud computing platform"; Electronic World; Nov. 8, 2016;5 pages (with English abstract).

METHOD AND APPARATUS FOR ADJUSTING MEMORY CONFIGURATION PARAMETER

CROSS-REFERECNE TO RELATED APPLICATIONS

This application is a national stage of International Application No. PCT/CN2021/116838, filed on Sep. 7, 2021, which claims priority to Chinese Patent Application No. 202010949797.5, filed on Sep. 10, 2020 and to Chinese Patent Application No. 202011574300.2, filed on Dec. 25, 2020, all of which are incorporated herein by reference in their entireties.

TECHNICAL FIELD

This application relates to the storage field, and in particular, to a method and an apparatus for adjusting a memory configuration parameter.

BACKGROUND

Memory (memory) is an integral part of a computer. When the computer runs a program, data related to program running may be temporarily stored in the memory, and is invoked by a processor. If memory resources are insufficient, the processor may need to wait for a period of time to obtain data required for program running. Therefore, a use status of the memory resource is associated with a program running status (such as a start rate).

To improve memory resource utilization, memory resource use needs to be managed. A method for managing a memory resource is to adjust memory based on a size of available memory. For example, when the available memory is less than a preset value, a value of an extra free memory configuration parameter (extra_free_kbytes) may be increased, so that a memory management module more actively reclaims the memory to meet a requirement of a program for the memory resource. However, an effect of managing the memory by using the method needs to be improved.

SUMMARY

This application provides a method and an apparatus for adjusting a memory configuration parameter, a computer program product, and a computer-readable storage medium, to improve a memory management effect.

According to a first aspect, a memory adjustment method is provided, including: obtaining a plurality of pieces of resource pressure, where the plurality of pieces of resource pressure are used to indicate a plurality of requirements for memory compression; and adjusting a memory configuration parameter based on the plurality of pieces of resource pressure, where there is a preset correspondence between the memory configuration parameter and each of the plurality of pieces of resource pressure.

The resource pressure is, for example, processor pressure, input/output (input/output, I/O) pressure, memory reclaim pressure, or memory swap space pressure. The processor pressure, the I/O pressure, and the memory reclaim pressure may be respectively determined by using pressure stall information (pressure stall information, PSI), I/O PSI, and memory reclaim PSI, and the memory swap space pressure may be determined by using available swap space (swap free) and/or a quantity of anonymous pages (anon pages). Memory compression requirements corresponding to different types of resource pressure are different. It is difficult to achieve optimal system performance by adjusting the memory configuration parameter based on one type of resource pressure. For example, when swap free is relatively low and anon pages is relatively low, it indicates that a use benefit of zRAM (an example of a memory compression technology) is not great. In this case, a value of a memory swap parameter (swappiness) needs to be reduced, to reduce a use frequency of zRAM. However, if the I/O pressure is relatively large, the value of swappiness needs to be increased. A relatively large value of swappiness can improve the use frequency of zRAM, to reclaim more anon pages, and avoid a continuous increase in the I/O pressure caused by reclaim of excessive file pages (file page) in a case of memory insufficiency. A reason for the continuous increase in the I/O pressure is that reclaim of excessive file pages causes a decrease in a hit rate of a cache (cache), the file page needs to be read from a disk to the cache again, there are more refault (refault) I/O phenomenons, and refault I/O causes a continuous increase in the I/O pressure. In consideration of the foregoing two types of information, swappiness needs to be set to a proper value to balance the memory swap space pressure and the I/O pressure, so that system performance can be optimized. Compared with a memory adjustment method implemented based on one type of information, the memory adjustment method provided in this application comprehensively considers a plurality of types of information, so that system performance can be optimized, and a memory management effect can be improved.

Optionally, the memory configuration parameter includes swappiness, and the plurality of pieces of resource pressure include I/O pressure and memory swap space pressure. The adjusting a memory configuration parameter based on the plurality of pieces of resource pressure includes: reducing the memory swap parameter when the I/O pressure decreases and the memory swap space pressure decreases; or adjusting the memory swap parameter to a preset value when the I/O pressure increases and the memory swap space pressure decreases.

Herein, swap free reflects the remaining capacity of a zRAM device, and anon pages reflects a data amount that can be input into the zRAM device. When swap free is relatively small and/or anon pages is relatively small (that is, the memory swap space pressure is relatively small), a use benefit of zRAM is not great, and a use frequency of zRAM may be reduced. When the I/O pressure is relatively small, a use frequency of zRAM may be reduced to save operation resources, and a value of swappiness may be reduced by comprehensively considering the memory swap space pressure and the I/O pressure, to achieve optimal system performance and improve a memory management effect.

When swap free is relatively small and/or anon pages is relatively small (that is, the memory swap space pressure is relatively small), a use benefit of zRAM is not great, and a use frequency of zRAM may be reduced. When the I/O pressure is relatively large, a value of swappiness needs to be increased, and a relatively large value of swappiness can improve a use frequency of zRAM, to reclaim more anon pages, and avoid a continuous increase in the I/O pressure caused by reclaim of excessive file pages in a case of memory insufficiency. In addition, swappiness may be set to a proper value (for example, a preset value) to balance the memory swap space pressure and the I/O pressure, to achieve optimal system performance and improve memory management.

Optionally, the memory configuration parameter includes swappiness, and the plurality of pieces of resource pressure include processor pressure and memory swap space pressure. The adjusting a memory configuration parameter based on the plurality of pieces of resource pressure includes: increasing swappiness when the processor pressure decreases and the memory swap space pressure increases.

When the processor pressure is relatively small, increasing swappiness can reduce a probability that a buffer bump occurs in a case of memory insufficiency, without affecting an operation resource requirement of another task. When the memory swap space pressure is relatively large, it indicates that a use benefit of zRAM is relatively great, and swappiness needs to be increased. In comprehensive consideration of the processor pressure and the memory swap space pressure, a value of swappiness may be increased to increase a use frequency of zRAM, to achieve optimal system performance and improve a memory management effect.

Optionally, the memory configuration parameter includes swappiness, the plurality of pieces of resource pressure include processor pressure and I/O pressure. The adjusting a memory configuration parameter based on the plurality of pieces of resource pressure includes: reducing the memory swap parameter when the I/O pressure decreases and the processor pressure increases; or adjusting the memory swap parameter to a preset value when the I/O pressure increases and the processor pressure increases.

When the I/O pressure is relatively small, a use frequency of zRAM may be reduced to save operation resources. When the processor pressure is relatively large, it indicates that current operation pressure is relatively large, and swappiness needs to be reduced to save operation resources. In comprehensive consideration of the I/O pressure and the processor pressure, swappiness may be reduced to save operation resources, to achieve optimal system performance and improve a memory management effect.

When the I/O pressure is relatively large, a value of swappiness needs to be increased, and a relatively large value of swappiness can increase a use frequency of zRAM, to reclaim more anon pages, and avoid a continuous increase in the I/O pressure caused by reclaim of excessive file pages. When the processor pressure is relatively large, swappiness needs to be reduced to save operation resources. In addition, swappiness may be set to a proper value (for example, a preset value) to balance the I/O pressure and the processor pressure, to achieve optimal system performance and improve a memory management effect.

Optionally, the adjusting a memory configuration parameter based on the plurality of pieces of resource pressure includes: when a current application running scenario indicated by scenario information does not meet a preset scenario, adjusting the memory configuration parameter based on the plurality of pieces of resource pressure.

The scenario information is, for example, information indicating application startup or application switching. When the preset scenario is an application startup scenario, various resource requirements of the application startup scenario are relatively fixed. Performing memory adjustment based on preset swappiness can achieve optimal system performance without collecting PSI and memory swap space pressure information for operation, to reduce memory adjustment complexity.

Optionally, the method further includes: reducing an extra free memory configuration parameter (extra_free_kbytes) when memory reclaim pressure increases; or increasing extra_free_kbytes when the memory reclaim pressure decreases.

A value of extra_free_kbytes is positively correlated with a size of memory reserved by a kernel, that is, a larger value of extra_free_kbytes indicates a larger size of the memory reserved by the kernel. When the memory reclaim pressure increases, it indicates that a quantity of current memory reclaim tasks is relatively large, and a memory requirement of a third-party APP is relatively high. In this case, extra_free_kbytes may be reduced, to reserve more memory for the third-party app. When the memory reclaim pressure decreases, it indicates that a quantity of current memory reclaim tasks is relatively small, and a memory requirement of a third-party APP is relatively low. In this case, extra_free_kbytes may be increased, to reserve more memory for the kernel.

Optionally, the adjusting a memory configuration parameter based on the plurality of pieces of resource pressure includes: when available memory is less than a memory threshold, adjusting the memory configuration parameter based on the plurality of pieces of resource pressure.

Adjusting the memory configuration parameter consumes operation resources. Therefore, when the available memory is relatively large, the memory configuration parameter does not need to be adjusted. When the available memory is relatively small, the memory configuration parameter may be adjusted based on the plurality of pieces of resource pressure, so that operation resources can be saved without affecting application running.

Optionally, a ratio of the memory threshold to a physical memory is negatively correlated with a size of the physical memory.

A size of the memory threshold may be set based on the size of the physical memory. When a physical memory of a terminal device is relatively large, a memory threshold may be set to a relatively low value. When the physical memory of the terminal device is relatively small, the memory threshold may be set to a relatively high value.

For example, if a physical memory of a terminal device A is 12 GB, and a physical memory of a terminal device B is 6 GB, a memavailable watermark of the terminal device A may be set to one third of the physical memory, that is, 4 GB, and a memavailable watermark of the terminal device B may be set to one half of the physical memory, that is, 3 GB. In this way, for a terminal device with a larger physical memory (the terminal device A), fewer operation resources can be consumed for memory adjustment while ensuring sufficient available memory. For a terminal device with a smaller physical memory (the terminal device B), memory adjustment may be performed in advance, to reduce a probability of occurrence of a problem such as memory insufficiency.

According to a second aspect, a memory adjustment apparatus is provided, including a unit configured to perform any method in the first aspect. The apparatus may be a terminal device, or may be a chip in the terminal device. The apparatus may include an input unit and a processing unit.

When the apparatus is the terminal device, the processing unit may be a processor, and the input unit may be a touchscreen, a keyboard, a mouse, a camera, a microphone, or another input device. The terminal device may further include a memory. The memory is configured to store computer program code, and when the processor executes the computer program code stored in the memory, the terminal device is enabled to perform any method in the first aspect.

When the apparatus is the chip in the terminal device, the processing unit may be a processing unit in the chip, and the input unit may be an input/output interface, a pin, a circuit, or the like. The chip may further include a memory. The memory may be a memory (for example, a register or a cache) in the chip, or may be a memory (for example, a read-only memory or a random access memory) outside the chip. The memory is configured to store computer program code, and when the processor executes the computer program code stored in the memory, the chip is enabled to perform any method in the first aspect.

According to a third aspect, a computer program product is provided. The computer program product includes computer program code, and when the computer program code is executed by a memory adjustment apparatus, the apparatus is enabled to perform any method in the first aspect.

According to a fourth aspect, a computer-readable storage medium is provided. The computer-readable storage medium stores computer program code, and when the computer program code is executed by a memory adjustment apparatus, the apparatus is enabled to perform any method in the first aspect.

DESCRIPTION OF EMBODIMENTS

The following describes technical solutions in embodiments of this application with reference to the accompanying drawings.

Figure 1:
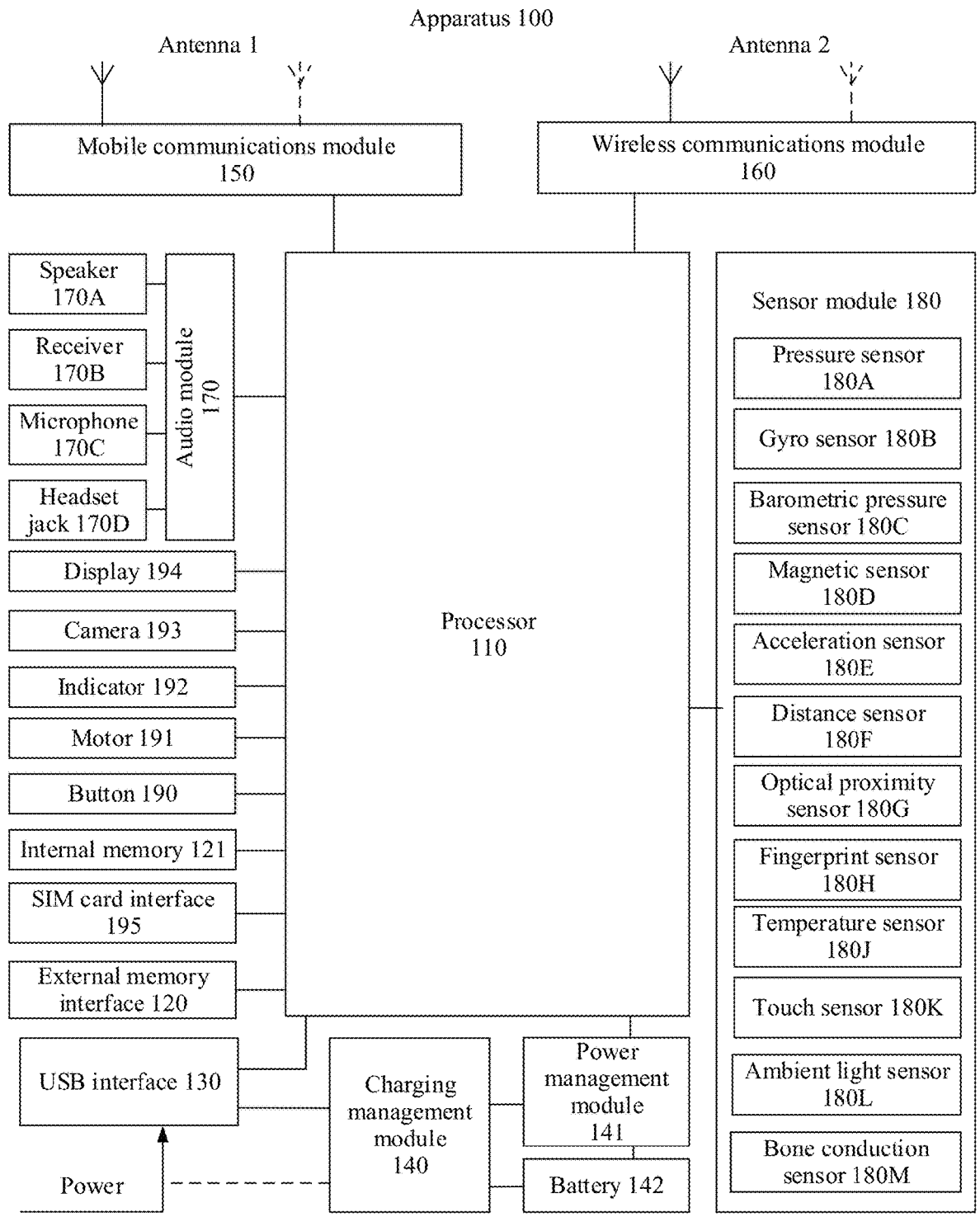
FIG. 1 is a schematic diagram of a hardware system of a terminal device according to this application.

FIG. 1 shows a hardware structure of an apparatus applicable to this application.

The apparatus 100 may be a mobile phone, a smart screen, a tablet computer, a wearable electronic device, a vehicle-mounted electronic device, an augmented reality (augmented reality, AR) device, a virtual reality (virtual reality, VR) device, a notebook computer, an ultra-mobile personal computer (ultra-mobile personal computer, UMPC), a netbook, a personal digital assistant (personal digital assistant, PDA), a projector, or the like. A specific type of the apparatus 100 is not limited in embodiments of this application.

The apparatus 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (subscriber identification module, SIM) card interface 195, and the like. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It should be noted that the structure shown in FIG. 1 does not constitute a specific limitation on the apparatus 100. In other embodiments of this application, the apparatus 100 may include more or fewer components than the components shown in FIG. 1, or the apparatus 100 may include a combination of some of the components shown in FIG. 1, or the apparatus 100 may include subcomponents of some of the components shown in FIG. 1. The components shown in FIG. 1 may be implemented by hardware, software, or a combination of software and hardware.

The processor 110 may include one or more processing units. For example, the processor 110 may include at least one of the following processing units: an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, and a neural-network processing unit (neural-network processing unit, NPU). Different processing units may be independent components, or may be integrated components.

The controller may generate an operation control signal based on an instruction operation code and a time sequence signal, to complete control of instruction reading and instruction execution.

A memory may be further disposed in the processor 110, and is configured to store instructions and data. In some embodiments, the memory in the processor 110 is a cache memory. The memory may store instructions or data just used or used cyclically by the processor 110. If the processor 110 needs to use the instructions or the data again, the processor 110 may directly invoke the instructions or the data from the memory, to avoid repeated access, and reduce a waiting time of the processor 110, thereby improving system efficiency.

In some embodiments, the processor 110 may include one or more interfaces. For example, the processor 110 may include at least one of the following interfaces: an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a SIM interface, and a USB interface.

The I2C interface is a two-way synchronization serial bus, and includes a serial data line (serial data line, SDA) and a serial clock line (derail clock line, SCL). In some embodiments, the processor 110 may include a plurality of groups of I2C buses. The processor 110 may be separately coupled to the touch sensor 180K, a charger, a flash, the camera 193, and the like through different I2C bus interfaces. For example, the processor 110 may be coupled to the touch sensor 180K through the I2C interface, so that the processor 110 communicates with the touch sensor 180K through the I2C bus interface, thereby implementing a touch function of the apparatus 100.

The I2S interface may be configured to perform audio communication. In some embodiments, the processor 110 may include a plurality of groups of I2C buses. The processor 110 may be coupled to the audio module 170 by using the I2S bus, to implement communication between the processor 110 and the audio module 170. In some embodiments, the audio module 170 may transmit an audio signal to the wireless communications module 160 through the I2S interface, to implement a function of answering a call by using a Bluetooth headset.

The PCM interface may also be configured to: perform audio communication, and sample, quantize, and encode an analog signal. In some embodiments, the audio module 170 may be coupled to the wireless communications module 160 through the PCM interface. In some embodiments, the audio module 170 may also transmit an audio signal to the wireless communications module 160 through the PCM interface, to implement a function of answering a call by using a Bluetooth headset. Both the I2S interface and the PCM interface may be configured to perform audio communication.

The UART interface is a universal serial data bus, and is configured to perform asynchronous communication. The bus may be a two-way communications bus, and converts to-be-transmitted data between serial communication and parallel communication. In some embodiments, the UART interface is usually configured to connect the processor 110 to the wireless communications module 160. For example, the processor 110 communicates with a Bluetooth module in the wireless communications module 160 through the UART interface, to implement a Bluetooth function. In some embodiments, the audio module 170 may transmit an audio signal to the wireless communications module 160 through UART interface, to implement a function of playing music by using a Bluetooth headset.

The MIPI interface may be configured to connect the processor 110 to a peripheral component such as the display 194 and the camera 193. The MIPI interface includes a camera serial interface (camera serial interface, CSI), a display serial interface (display serial interface, DSI), and the like. In some embodiments, the processor 110 communicates with the camera 193 through the CSI interface, to implement a photographing function of the apparatus 100. The processor 110 communicates with the display 194 through the DSI interface, to implement a display function of the apparatus 100.

The GPIO interface may be configured by software. The GPIO interface may be configured as a control signal interface, or may be configured as a data signal interface. In some embodiments, the GPIO interface may be configured to connect the processor 110 to the camera 193, the display 194, the wireless communications module 160, the audio module 170, and the sensor module 180. The GPIO interface may also be configured as the I2C interface, the I2S interface, the UART interface, or the MIPI interface.

The USB interface 130 is an interface that conforms to a USB standard specification, for example, may be a mini (Mini) USB interface, a micro (Micro) USB interface, or a USB type-C (USB Type C) interface. The USB interface 130 may be configured to connect the charger to charge the apparatus 100, may be configured to transmit data between the apparatus 100 and the peripheral device, or may be configured to connect the headset to play audio by using the headset. The USB interface 130 may be further configured to be connected to another apparatus 100, such as an AR device.

A connection relationship between the modules that is shown in FIG. 1 is merely an example for description, and does not constitute a limitation on the connection relationship between the modules of the apparatus 100. Optionally, the modules of the apparatus 100 may alternatively use a combination of a plurality of connection manners in the foregoing embodiment.

The charging management module 140 is configured to receive power from the charger. The charger may be a wireless charger, or may be a wired charger. In some embodiments of wired charging, the charging management module 140 may receive a current of the wired charger through the USB interface 130. In some embodiments of wireless charging, the charging management module 140 may receive an electromagnetic wave (a current path is shown in a dashed line) by using a wireless charging coil of the apparatus 100. The charging management module 140 may further supply power to the apparatus 100 through the power management module 141 while charging the battery 142.

The power management module 141 is configured to connect the battery 142 and the charging management module 140 to the processor 110. The power management module 141 receives an input of the battery 142 and/or an input of the charging management module 140, and supplies power to the processor 110, the internal memory 121, the display 194, the camera 193, the wireless communications module 160, and the like. The power management module 141 may be further configured to monitor parameters such as a battery capacity, a battery cycle count, and a battery health status (such as electric leakage or impedance). Optionally, the power management module 141 may be disposed in the processor 110, or the power management module 141 and the charging management module 140 may be disposed in a same component.

A wireless communications function of the apparatus 100 may be implemented through components such as the antenna 1, the antenna 2, the mobile communications module 150, the wireless communications module 160, the modem processor, and the baseband processor.

The antenna 1 and the antenna 2 are configured to transmit and receive electromagnetic wave signals. Each antenna in the apparatus 100 may be configured to cover one or more communications frequency bands. Different antennas may be further multiplexed to improve antenna utilization. For example, the antenna 1 may be multiplexed as a diversity antenna of a wireless local area network. In some other embodiments, the antenna may be used in combination with a tuning switch.

The mobile communications module 150 may provide a wireless communications solution applied to the apparatus 100, for example, at least one of the following solutions: a 2th generation ($2^{th}$ generation, 2G) mobile communications solution, a 3th generation ($3^{th}$ generation, 3G) mobile communications solution, a 4th generation ($4^{th}$ generation, 5G) mobile communications solution, and a 5th generation ($5^{th}$ generation, 5G) mobile communications solution. The mobile communications module 150 may include at least one filter, a switch, a power amplifier, a low noise amplifier (low noise amplifier, LNA), and the like. The mobile communications module 150 may receive an electromagnetic wave through the antenna 1, perform processing such as filtering and amplification on the received electromagnetic wave, and send a processed electromagnetic wave to the modem processor for demodulation. The mobile communications module 150 may further amplify a signal modulated by the modem processor, and convert the amplified signal into an electromagnetic wave for radiation through the antenna 1. In some embodiments, at least some function modules in the mobile communications module 150 may be disposed in the processor 110. In some embodiments, at least some function modules in the mobile communications module 150 may be disposed in a same device as at least some modules in the processor 110.

The modem processor may include a modulator and a demodulator. The modulator is configured to modulate a to-be-sent low-frequency baseband signal into a medium or high-frequency signal. The demodulator is configured to demodulate a received electromagnetic wave signal into a low-frequency baseband signal. Then, the demodulator transmits the low-frequency baseband signal obtained through demodulation to the baseband processor for processing. After being processed by the baseband processor, the low-frequency baseband signal is transmitted to the application processor. The application processor outputs a sound signal through an audio device (such as the speaker 170A or the receiver 170B), or displays an image or a video through the display 194. In some embodiments, the modem processor may be an independent component. In some other embodiments, the modem processor may be independent of the processor 110, and is disposed in a same device as the mobile communications module 150 or another function module.

Similar to the mobile communications module 150, the wireless communications module 160 may also provide a wireless communications solution applied to the apparatus 100, for example, at least one of the following solutions: a wireless local area network (wireless local area networks, WLAN), Bluetooth (Bluetooth, BT), a global navigation satellite system (global navigation satellite system, GNSS), frequency modulation (frequency modulation, FM), near field communication (near field communication, NFC), and infrared (infrared, IR). The wireless communications module 160 may be one or more components integrating at least one communications processor module. The wireless communications module 160 receives an electromagnetic wave through the antenna 2, performs frequency modulation and filtering on an electromagnetic wave signal, and sends a processed signal to the processor 110. The wireless communications module 160 may further receive a to-be-sent signal from the processor 110, perform frequency modulation and amplification on the signal, and convert the signal into an electromagnetic wave for radiation through the antenna 2.

In some embodiments, the antenna 1 of the apparatus 100 is coupled to the mobile communications module 150, and the antenna 2 of the apparatus 100 is coupled to the wireless communications module 160.

The apparatus 100 may implement a display function through the GPU, the display 194, and the application processor. The GPU is a microprocessor for image processing, and is connected to the display 194 and the application processor. The GPU is configured to perform mathematical and geometric calculation and perform graphics rendering. The processor 110 may include one or more GPUs that execute program instructions to generate or change display information.

The display 194 may be configured to display an image or a video. The display 194 includes a display panel. The display panel may be a liquid crystal display (liquid crystal display, LCD), an organic light-emitting diode (organic light-emitting diode, OLED), an active-matrix organic light-emitting diode (active-matrix organic light-emitting diode, AMOLED), a flexible light-emitting diode (flex light-emitting diode, FLED), a mini light-emitting diode (mini light-emitting diode, Mini LED), a micro light-emitting diode (micro light-emitting diode, Micro LED), a micro OLED (Micro OLED), or a quantum dot light emitting diode (quantum dot light emitting diodes, QLED). In some embodiments, the apparatus 100 may include one or N displays 194, where N is a positive integer greater than 1.

The apparatus 100 may implement a photographing function through the ISP, the camera 193, the video codec, the GPU, the display 194, the application processor, and the like.

The ISP is configured to process data fed back by the camera 193. For example, during photographing, a shutter is pressed, light is transmitted to a photosensitive element of the camera through a lens, and an optical signal is converted into an electrical signal. The photosensitive element of the camera transmits the electrical signal to the ISP for processing, to convert the electrical signal into a visible image. The ISP may perform algorithm optimization on noise, brightness, and a color of an image, and the ISP may further optimize parameters such as exposure and color temperature of a photographing scenario. In some embodiments, the ISP may be disposed in the camera 193.

The camera 193 is configured to capture a still image or a video. An object generates an optical image through the lens and projects the optical image to the photosensitive element. The photosensitive element may be a charge coupled device (charge coupled device, CCD) or a complementary metal-oxide-semiconductor (complementary metal-oxide-semiconductor, CMOS) phototransistor. The photosensitive element converts an optical signal into an electrical signal, and then transmits the electrical signal to the ISP, so that the ISP converts the electrical signal into a digital image signal. The ISP outputs the digital image signal to the DSP for processing. The DSP converts the digital image signal into an image signal in a standard format such as red green blue (red green blue, RGB) or YUV. In some embodiments, the apparatus 100 may include one or N displays 193, where N is a positive integer greater than 1.

The digital signal processor is configured to process a digital signal. In addition to a digital image signal, the digital signal processor may also process another digital signal. For example, when the apparatus 100 selects a frequency, the digital signal processor is configured to perform Fourier transform on frequency energy.

The video codec is configured to compress or decompress a digital video. The apparatus 100 may support one or more video codecs. In this way, the apparatus 100 may play or record videos in a plurality of encoding formats, for example, moving picture experts group (moving picture experts group, MPEG) 1, MPEG 2, MPEG3, and MPEG4.

The NPU is a processor that quickly processes input information by referring to a structure of a biological neural network, for example, by referring to a transfer mode between human brain neurons, and may further continuously perform self-learning. Functions such as intelligent cognition of the apparatus 100 may be implemented by using the NPU, for example, image recognition, facial recognition, speech recognition, and text understanding.

The external memory interface 120 may be configured to connect to an external storage card, such as a secure digital (secure digital, SD) card, to extend a storage capability of the apparatus 100. The external storage card communicates with the processor 110 through the external memory interface 120, to implement a data storage function. For example, a file such as music or a video is stored in the external storage card.

The internal memory 121 may be configured to store computer executable program code, where the executable program code includes instructions. The internal memory 121 may include a program storage area and a data storage area. The storage program area may store an operating system and an application required by at least one function (such as a sound play function and an image play function). The storage data area may store data (such as audio data and a phone book) created in a process of using the apparatus 100. In addition, the internal memory 121 may include a high-speed random access memory, and may further include a non-volatile memory, such as at least one disk storage device, a flash memory, or a universal flash storage (universal flash storage, UFS). The processor 110 executes various processing methods of the apparatus 100 by running instructions stored in the internal memory 121 and/or instructions stored in the memory disposed in the processor.

The apparatus 100 may implement an audio function such as music play or recording through the audio module 170, the speaker 170A, the receiver 170B, the microphone 170C, the headset jack 170D, an application processor, and the like.

The audio module 170 is configured to convert digital audio information into an analog audio signal output, and is also configured to convert an analog audio input into a digital audio signal. The audio module 170 may be further configured to encode and decode an audio signal. In some embodiments, the audio module 170 or some function modules of the audio module 170 may be disposed in the processor 110.

The speaker 170A, also referred to as a "horn", is configured to convert an audio electrical signal into a sound signal. The apparatus 100 may be used to listen to music or answer a call in a hands-free mode through the speaker 170A.

The receiver 170B, also referred to as an "earpiece", is configured to convert an audio electrical signal into a sound signal. When a user uses the apparatus 100 to answer a call or listen to voice information, the receiver 170B may be put close to a human ear to listen to a voice.

The microphone 170C, also referred to as a "mike" or a "microphone", is configured to convert a sound signal into an electrical signal. When making a call or sending a voice message, the user may make a sound near the microphone 170C, to input a sound signal to the microphone 170C. At least one microphone 170C may be disposed in the apparatus 100. In other embodiments, two microphones 170C may be disposed in the apparatus 100, to implement noise reduction function. In other embodiments, three, four, or more microphones 170C may alternatively be disposed in the apparatus 100, to identify a sound source, implement directional recording, and the like. The processor 110 may process an electrical signal output by the microphone 170C. For example, the audio module 170 and the wireless communications module 160 may be coupled through the PCM interface. After converting an ambient sound into an electrical signal (for example, a PCM signal), the microphone 170C transmits the electrical signal to the processor 110 through the PCM interface. The processor 110 performs volume analysis and frequency analysis on the electrical signal to determine volume and frequency of the ambient sound.

The headset jack 170D is configured to connect to a wired headset. The headset jack 170D may be the USB interface 130, or may be a 3.5 mm open mobile terminal platform (open mobile terminal platform, OMTP) standard interface, or a cellular telecommunications industry association of the USA (cellular telecommunications industry association of the USA, CTIA) standard interface.

The pressure sensor 180A is configured to sense a pressure signal, and may convert the pressure signal into an electrical signal. In some embodiments, the pressure sensor 180A may be disposed on the display 194. There are many types of pressure sensors 180A, such as a resistive pressure sensor, an inductive pressure sensor, and a capacitive pressure sensor. The capacitive pressure sensor may include at least two parallel plates made of conductive materials. When a force is applied to the pressure sensor 180A, capacitance between electrodes changes. The apparatus 100 determines pressure intensity based on the change in the capacitance. When a touch operation is performed on the display 194, the apparatus 100 detects the touch operation through the pressure sensor 180A. The apparatus 100 may also calculate a touch location based on a detection signal of the pressure sensor 180A. In some embodiments, touch operations that are performed at a same touch location but have different touch operation intensity may correspond to different operation instructions. For example, when a touch operation whose touch operation intensity is less than a first pressure threshold is performed on a Messages application icon, an instruction for viewing an SMS message is performed. When a touch operation whose touch operation intensity is greater than or equal to the first pressure threshold is performed on the Messages application icon, an instruction for creating a new SMS message is performed.

The gyro sensor 180B may be configured to determine a moving posture of the apparatus 100. In some embodiments, an angular velocity of the apparatus 100 around three axes (namely, axes x, y, and z) may be determined through the gyro sensor 180B. The gyro sensor 180B may be configured to implement image stabilization during photographing. For example, when the shutter is pressed, the gyro sensor 180B detects an angle at which the apparatus 100 jitters, and calculates, based on the angle, a distance for which a lens module needs to be compensated, and allows the lens to cancel the jitter of the apparatus 100 through reverse motion, to implement image stabilization. The gyro sensor 180B may also be used in a navigation scenario and a somatic game scenario.

The barometric pressure sensor 180C is configured to measure barometric pressure. In some embodiments, the apparatus 100 calculates an altitude by using the barometric pressure measured by the barometric pressure sensor 180C, to assist in positioning and navigation.

The magnetic sensor 180D includes a Hall sensor. The apparatus 100 may detect opening and closing of a flip cover through the magnetic sensor 180D. In some embodiments, when the apparatus 100 is a clamshell phone, the apparatus 100 may detect opening and closing of a flip over based on the magnetic sensor 180D. Further, the apparatus may set a feature such as automatic unlocking upon opening of the flip cover based on a detected opening or closing state of the flip cover.

The acceleration sensor 180E may detect magnitude of acceleration in various directions (generally on three axes: x, y, and z) of the apparatus 100, and may detect magnitude and a direction of the gravity when the apparatus 100 is still. The acceleration sensor 180E may be further configured to identify a posture of the apparatus 100, which is used as an input parameter of an application such as switching between landscape mode and portrait mode or a pedometer.

The distance sensor 180F is configured to measure a distance. The apparatus 100 may measure the distance in an infrared or a laser manner. In some embodiments, for example, in a photographing scenario, the apparatus 100 may measure a distance through the distance sensor 180F to implement quick focusing.

The optical proximity sensor 180G may include, for example, a light emitting diode (light-emitting diode, LED) and an optical detector, for example, a photodiode. The LED may be an infrared LED. The apparatus 100 emits infrared light through the LED. The apparatus 100 detects infrared reflected light from a nearby object by using the photodiode. When reflected light is detected, the apparatus 100 may determine that there is an object near the apparatus 100. When no reflected light is detected, the apparatus 100 may determine that there is no object near the apparatus 100. The apparatus 100 may detect, through the optical proximity sensor 180G, whether the user holds the apparatus 100 close to an ear to make a call, to automatically perform screen-off for power saving. The optical proximity sensor 180G may also be used in a smart cover mode or a pocket mode to automatically perform screen unlocking or locking.

The ambient light sensor 180L is configured to sense ambient light brightness. The apparatus 100 may adaptively adjust brightness of the display 194 based on the sensed ambient light brightness. The ambient light sensor 180L may also be configured to automatically adjust white balance during photographing. The ambient light sensor 180L may further cooperate with the optical proximity sensor 180G to detect whether the apparatus 100 is in a pocket, to avoid an accidental touch.

The fingerprint sensor 180H is configured to collect a fingerprint. The apparatus 100 may use a feature of the collected fingerprint to implement fingerprint-based unlocking, application lock access, fingerprint-based photographing, fingerprint-based call answering, and the like.

The temperature sensor 180J is configured to detect a temperature. In some embodiments, the apparatus 100 executes a temperature processing policy by using the temperature detected by the temperature sensor 180J. For example, when the temperature reported by the temperature sensor 180J exceeds a threshold, the apparatus 100 lowers performance of a processor nearby the temperature sensor 180J, to reduce power consumption for thermal protection. In other embodiments, when the temperature is lower than another threshold, the apparatus 100 heats the battery 142 to prevent the apparatus 100 from being shut down abnormally because of a low temperature. In other embodiments, when the temperature is lower than still another threshold, the apparatus 100 boosts an output voltage of the battery 142 to avoid abnormal shutdown caused by a low temperature.

The touch sensor 180K may also be referred to as a "touch component". The touch sensor 180K may be disposed on the display 194, and the touch sensor 180K and the display 194 form a touchscreen, which is also referred to as a "touchscreen". The touch sensor 180K is configured to detect a touch operation on or near the touch sensor 180K. The touch sensor 180K may transfer the detected touch operation to the application processor to determine a touch event type. A visual output related to the touch operation may be provided by the display 194. In other embodiments, the touch sensor 180K may alternatively be disposed on a surface of the apparatus 100 at a location different from that of the display 194.

The bone conduction sensor 180M may obtain a vibration signal. In some embodiments, the bone conduction sensor 180M may obtain a vibration signal of a vibration bone of a human vocal-cord part. The bone conduction sensor 180M may also contact a human pulse to receive a blood pressure beating signal. In some embodiments, the bone conduction sensor 180M may alternatively be disposed in the headset, to obtain a bone conduction headset. The audio module 170 may parse out a speech signal through parsing based on the vibration signal that is of the vibration bone of the human vocal-cord part and that is obtained by the bone conduction sensor 180M, to implement a speech function. The application processor may parse heart rate information based on the blood pressure beating signal obtained by the bone conduction sensor 180M, to implement a heart rate detection function.

The button 190 includes a power button and a volume button. The button 190 may be a mechanical button, or may be a touch button. The apparatus 100 may receive a key input signal, to implement a function related to the key input signal.

The motor 191 may generate vibration. The motor 191 may be configured to provide an incoming call prompt or a touch feedback. The motor 191 may generate different vibration feedback effects on touch operations performed on different applications. The motor 191 may also generate different vibration feedback effects for touch operations on different areas of the display 194. Different application scenarios (for example, a time reminder, information receiving, an alarm clock, and a game) may correspond to different vibration feedback effects. A touch vibration feedback effect may be further customized.

The indicator 192 may be an indicator light, and may be configured to indicate a charging status and a power change, or may be configured to indicate a message, a missed call, and a notification.

The SIM card interface 195 is configured to connect to a SIM card. The SIM card may be inserted into the SIM card interface 195 or detached from the SIM card interface 195, to implement contact with or separation from the apparatus 100. The apparatus 100 may support one or N SIM card interfaces, where N is a positive integer greater than 1. A plurality of cards may be simultaneously inserted into a same SIM card interface 195, and types of the plurality of cards may be the same or different. The SIM card interface 195 may be further compatible with an external storage card. The apparatus 100 interacts with a network by using the SIM card, to implement functions such as conversation and data communication. In some embodiments, the apparatus 100 uses an embedded SIM (embedded-SIM, eSIM) card, and the eSIM card may be embedded into the apparatus 100, and cannot be separated from the apparatus 100.

The foregoing describes in detail the hardware system of the apparatus 100. The following describes a software system of the apparatus 100. The software system may use a layered architecture, an event-driven architecture, a microkernel architecture, a micro service architecture, or a cloud architecture. In embodiments of this application, the layered architecture is used as an example to describe the software system of the apparatus 100.

Figure 2:
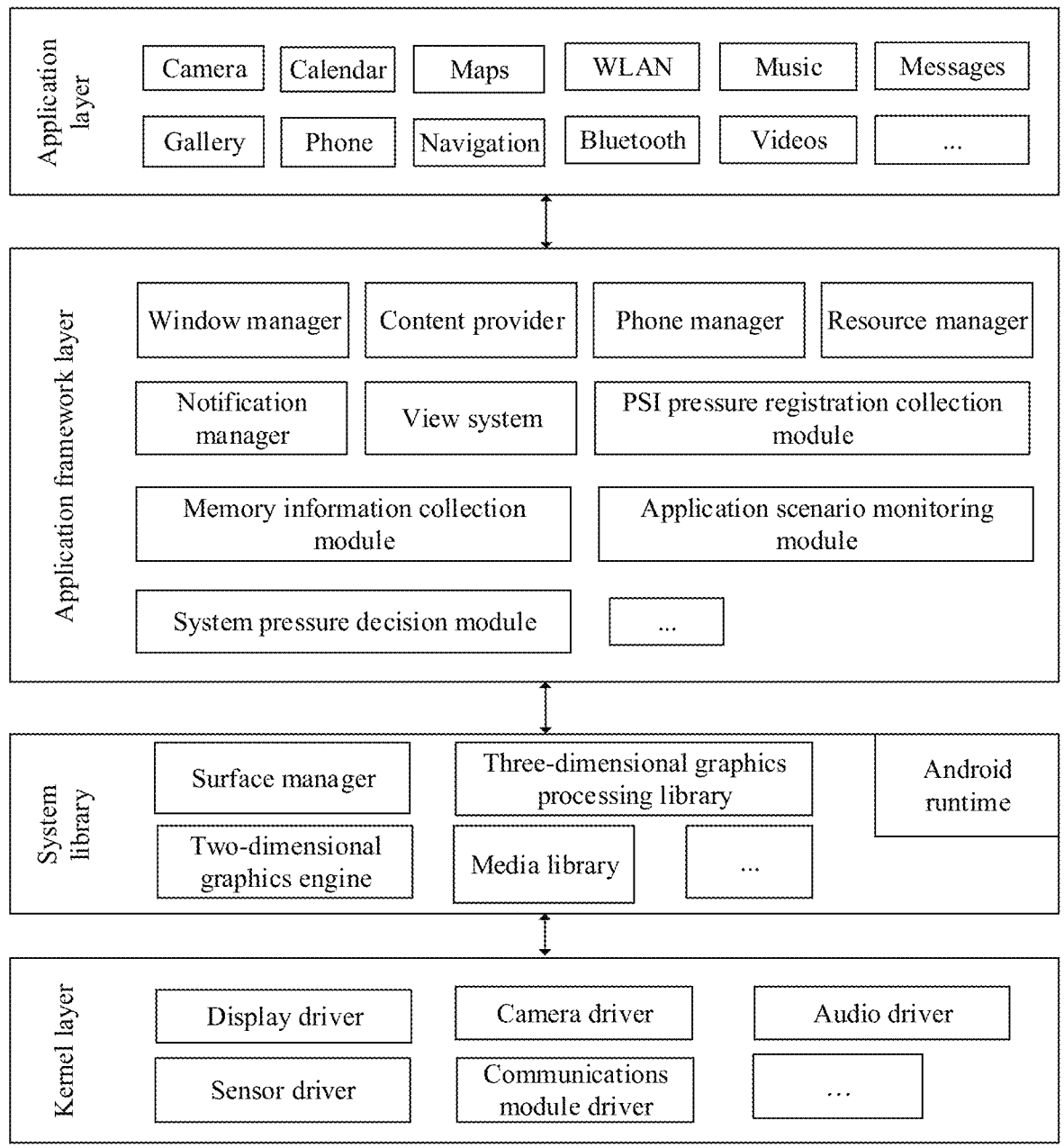
FIG. 2 is a schematic diagram of a software system of a terminal device according to this application.

As shown in FIG. 2, the software system using the layered architecture is divided into several layers, and each layer has a clear role and task. The layers communicate with each other through a software interface. In some embodiments, the software system may be divided into four layers: an application layer, an application framework layer, an Android runtime (Android Runtime) and system library, and a kernel layer from top to bottom.

The application layer may include applications such as Camera, Gallery, Calendar, Calls, Maps, Navigation, WLAN, Bluetooth, Music, Videos, and Messages.

The application framework layer provides an application programming interface (application programming interface, API) and a programming framework for the applications at the application layer. The application framework layer may include some predefined functions.

For example, the application framework layer includes a window manager, a content provider, a view system, a phone manager, a resource manager, a notification manager, a PSI pressure registration collection module, a memory information collection module, an application scenario monitoring module, and a system pressure decision module.

The window manager is configured to manage a window program. The window manager may obtain a size of a display, and determine whether there is a status bar, a lock screen, and an intercept screen.

The content provider is configured to: store and obtain data, and enable the data to be accessed by an application. The data may include a video, an image, audio, calls that are made and received, a browsing history and bookmarks, and an address book.

The view system includes visual controls such as a control for displaying text and a control for displaying an image. The view system may be configured to construct an application. A display interface may include one or more views, for example, a display interface including a Messages notification icon, and may include a view for displaying text and a view for displaying a picture.

The phone manager is configured to provide a communication function of the apparatus 100, such as management of a call status (answering or declining).

The resource manager provides an application with various resources such as a localized character string, an icon, an image, a layout file, and a video file.

The notification manager enables an application to display notification information in a status bar, and may be configured to convey a notification message. The notification message may automatically disappear after a short pause without requiring a user interaction. For example, the notification manager is configured to notify download completion, and give a message notification. The notification manager may alternatively be a notification that appears in a top status bar of the system in a form of a graph or a scroll bar text, for example, a notification of an application running on the background. The notification manager may alternatively be a notification that appears on the screen in a form of a dialog window. For example, text information is displayed in the status bar, an alert sound is made, the electronic device vibrates, or an indicator light blinks.

The PSI pressure registration collection module is configured to collect various types of PSI, such as central processing unit (central processing unit, CPU) running time, memory reclaim time, and I/O waiting time. The memory information collection module is configured to collect memory-related information such as available memory, swap free, and anon pages. The application scenario monitoring module is configured to collect scenario information such as APP startup and APP switching.

The system pressure decision module is configured to make a memory adjustment decision based on the information collected by the PSI pressure registration collection module, the memory information collection module, and the application scenario monitoring module.

The Android runtime includes a core library and a virtual machine. The Android runtime is responsible for scheduling and management of the Android system.

The core library includes two parts: a function that needs to be invoked in Java language, and a core library of Android.

The application layer and the application framework layer run on the virtual machine. The virtual machine executes Java files of the application layer and the application framework layer as binary files. The virtual machine is configured to implement functions such as object lifecycle management, stack management, thread management, security and exception management, and garbage collection.

The system library may include a plurality of function modules, such as a surface manager (surface manager), a media library (Media Libraries), a three-dimensional graphics processing library (such as OpenGL ES), and a 2D graphics engine (such as SGL).

The surface manager is configured to manage a display subsystem and provide fusion of 2D and 3D layers for a plurality of applications.

The media library supports play and recording in a plurality of audio formats, play and recording in a plurality of video formats, and static image files. The media library may support a plurality of audio and video coding formats, such as MPEG4, H.264, MP3, AAC, AMR, JPG, and PNG.

The three-dimensional graphics processing library may be configured to implement three-dimensional graphics drawing, image rendering, composition, and layer processing.

The 2D graphics engine is a drawing engine for 2D drawing.

The kernel layer is a layer between hardware and software. The kernel layer includes at least a display driver, a camera driver, an audio driver, and a sensor driver.

With reference to a photographing scenario, the following illustrates the software system of the apparatus 100 and the working procedure of the hardware system.

When a user performs a touch operation on the touch sensor 180K, a corresponding hardware interrupt is sent to an operating system layer. The operating system layer processes the touch operation into an original input event, and the original input event includes information such as touch coordinates and a timestamp of the touch operation. Then, the operating system layer identifies a control corresponding to the original input event, and notifies an application (application, APP) corresponding to the control. For example, if the touch operation is a tap operation, and the APP corresponding to the control is a camera APP, the camera APP may invoke a background service by using the API, transmit a control instruction to a logical port management module, and control the camera 193 to perform photographing by using the logical port management module.

When the camera APP runs, data related to the camera APP may be temporarily stored in a memory, and invoked by the processor. If memory resources are insufficient, the processor may need to wait for a period of time to obtain data of the camera APP. Therefore, a use status of the memory resource is associated with a running status (such as a start rate) of the camera APP.

To improve memory resource utilization, memory resource usage needs to be managed. The memory resource may be managed by adjusting a memory configuration parameter. The following describes two memory configuration parameters applicable to this application.

1. Extra free memory configuration parameter (extra_free_kbytes).

A configuration manner of extra_free_kbytes may be /proc/sys/vm/extra_free_kbytes, which means that values of a low water line (low watermark) and a high water line (high watermark) are improved without changing a minimum water line (min watermark).

A value of extra_free_kbytes is positively correlated with a size of memory reserved by a kernel, that is, a larger value of extra_free_kbytes indicates a larger size of the memory reserved by the kernel, and correspondingly, a smaller size of memory that may be used by a third-party APP (such as a camera APP). When the value of extra_free_kbytes is relatively large, a memory management function kswapd/kcompactd is triggered more frequently, and a memory reclaim function lowmemorykiller is triggered more frequently, so that more memory is reserved for the core. When the value of extra_free_kbytes is relatively small, the third-party APP can use more memory, but a probability of direct reclaim (direct reclaim) or I/O blocking increases when the memory is allocated.

2. Memory swap parameter (swappiness).

A configuration manner of swappiness may be /proc/sys/vm/swappiness. A kernel attempts to switch runtime memory to zRAM at runtime, or obtain more memory by deleting a memory page in a system cache, and swappiness is used to balance use frequencies of the two manners. A larger value of swappiness indicates that the kernel switches the runtime memory to zRAM more actively. A smaller value of swappiness indicates that the kernel more tends to delete the memory page in the system cache.

A memory management manner of the kernel can be controlled by setting a value of a memory configuration parameter. If the value of the memory configuration parameter is set inappropriately, system performance may be degraded. For example, when a value of swappiness is relatively small, if a large quantity of file read tasks currently exist, the system is in a buffer bumpy state (that is, a state in which a file page is frequently and repeatedly read and released due to memory insufficiency). Even if there is a large amount of remaining space in current zRAM, the space cannot be utilized, and consequently a system I/O load is high.

The following describes in detail a memory adjustment method provided in this application.

Figure 3:
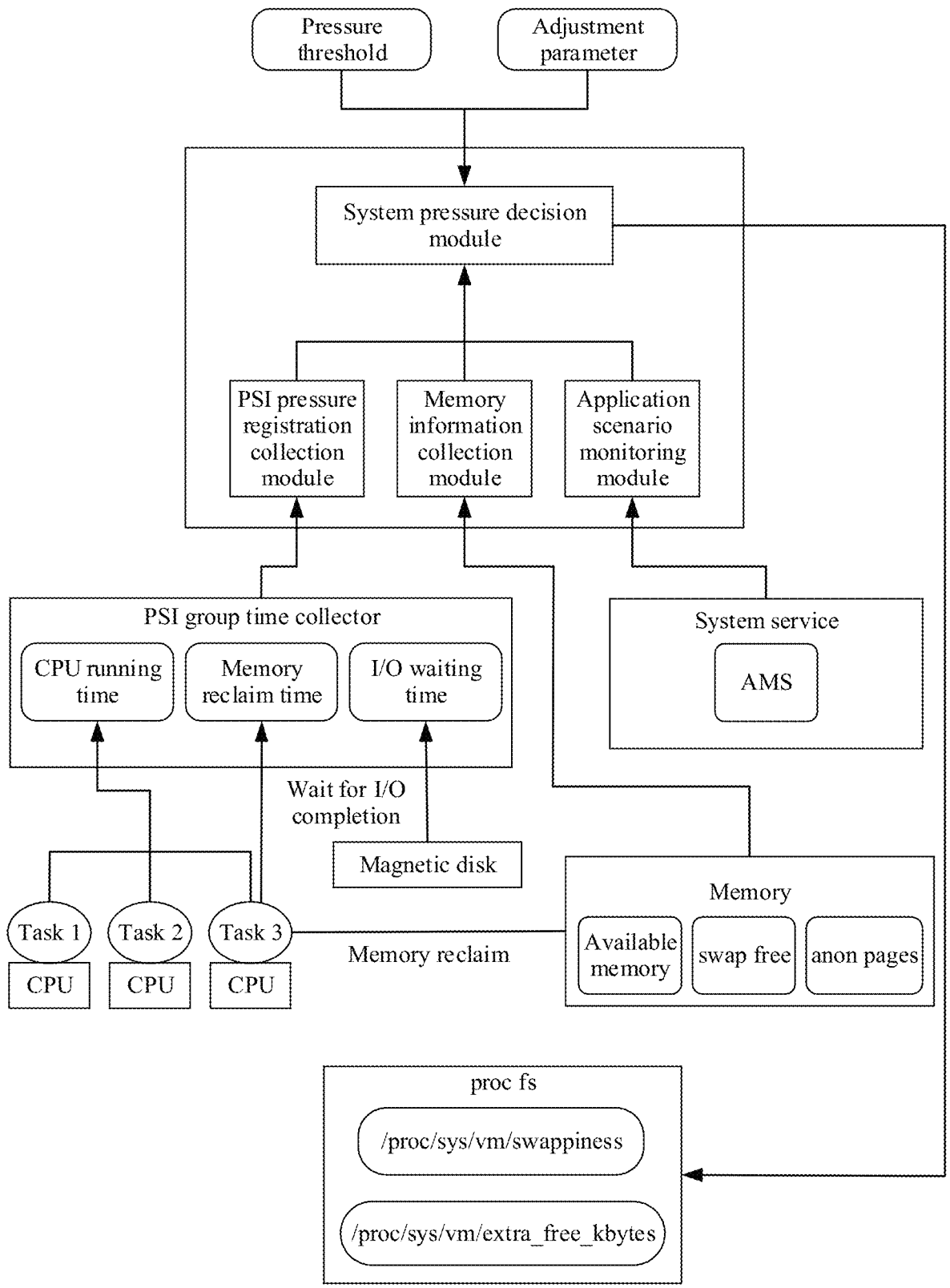
FIG. 3 is a schematic diagram of a memory adjustment system according to this application.

The memory adjustment method provided in this application can be applied to the system shown in FIG. 3. The system includes a PSI pressure registration collection module, a memory information collection module, an application scenario monitoring module, and a system pressure decision module.

The PSI pressure registration collection module is configured to collect various types of PSI from a PSI group time collector (PSI group time collector). The PSI group time collector is configured to count a cumulative time of a state in which a task of each group is located, such as a CPU running time (CPU running time), a memory reclaim time (memory reclaim time), and an I/O waiting time (I/O waiting time). The CPU running time is CPU PSI, and reflects operation pressure of the system. The memory reclaim time is memory reclaim PSI, and reflects memory reclaim pressure of the system. The I/O waiting time is I/O PSI, and reflects I/O pressure of the system.

For example, a CPU may process a plurality of tasks. The plurality of tasks include a memory reclaim task, a time consumed by the CPU to complete the plurality of tasks is the CPU running time, and a time used by the CPU to complete a memory reclaim task is the memory reclaim time. In addition, a time used to read and write the foregoing plurality of tasks from and into a disk (disk) is the I/O waiting time.

The memory information collection module is configured to read /prof/meminfo by using a prof fs file system, and /prof/meminfo is, for example, available memory (memory available), available swap space (swap free), and a quantity of anonymous pages (anon pages).

Herein, swap free reflects the remaining capacity of zRAM, and anon pages reflects a data amount that can be input into zRAM. When swap free is relatively small and anon pages is relatively small, a use benefit of zRAM is not great, and a use frequency of zRAM may be reduced. When swap free is relatively large and anon pages is relatively large, a use benefit of zRAM is great, and a use frequency of zRAM may be increased. Adjusting a memory configuration parameter consumes operation resources. Therefore, when the available memory (physical memory) is relatively large, the memory configuration parameter does not need to be adjusted. When the available memory is relatively small, the memory configuration parameter may be adjusted.

The application scenario monitoring module is configured to collect scenario information such as APP startup and APP switching. For example, the scenario information may be obtained by using an activity manager service (activity manager service, AMS) in a system service.

The system pressure decision module may obtain a pressure threshold and an adjustment parameter. The pressure threshold may be a threshold for counting a size of a time window of PSI, a threshold for reporting different pressure, a threshold for the remaining space of zRAM, a threshold for a size of anon page, or the like. The adjustment parameter may be an upper limit, a lower limit, a preset value, or the like for adjusting swappiness. The system pressure decision module may further make a memory adjustment decision based on the pressure threshold, the adjustment parameter, and the information collected by the PSI pressure registration collection module, the memory information collection module, and the application scenario monitoring module. For example, swappiness and extra_free_kbytes may be adjusted by using the proc fs file system.

The following describes in detail working procedures of the PSI pressure registration collection module, the memory information collection module, the application scenario monitoring module, and the system pressure decision module.

The PSI pressure registration collection module may collect a plurality of types of PSI, such as CPU PSI, memory reclaim PSI, and I/O PSI. Each type of PSI may be classified into a plurality of levels. For example, the CPU PSI may correspond to a high pressure event, a medium pressure event, and a low pressure event based on different values.

Figure 4:
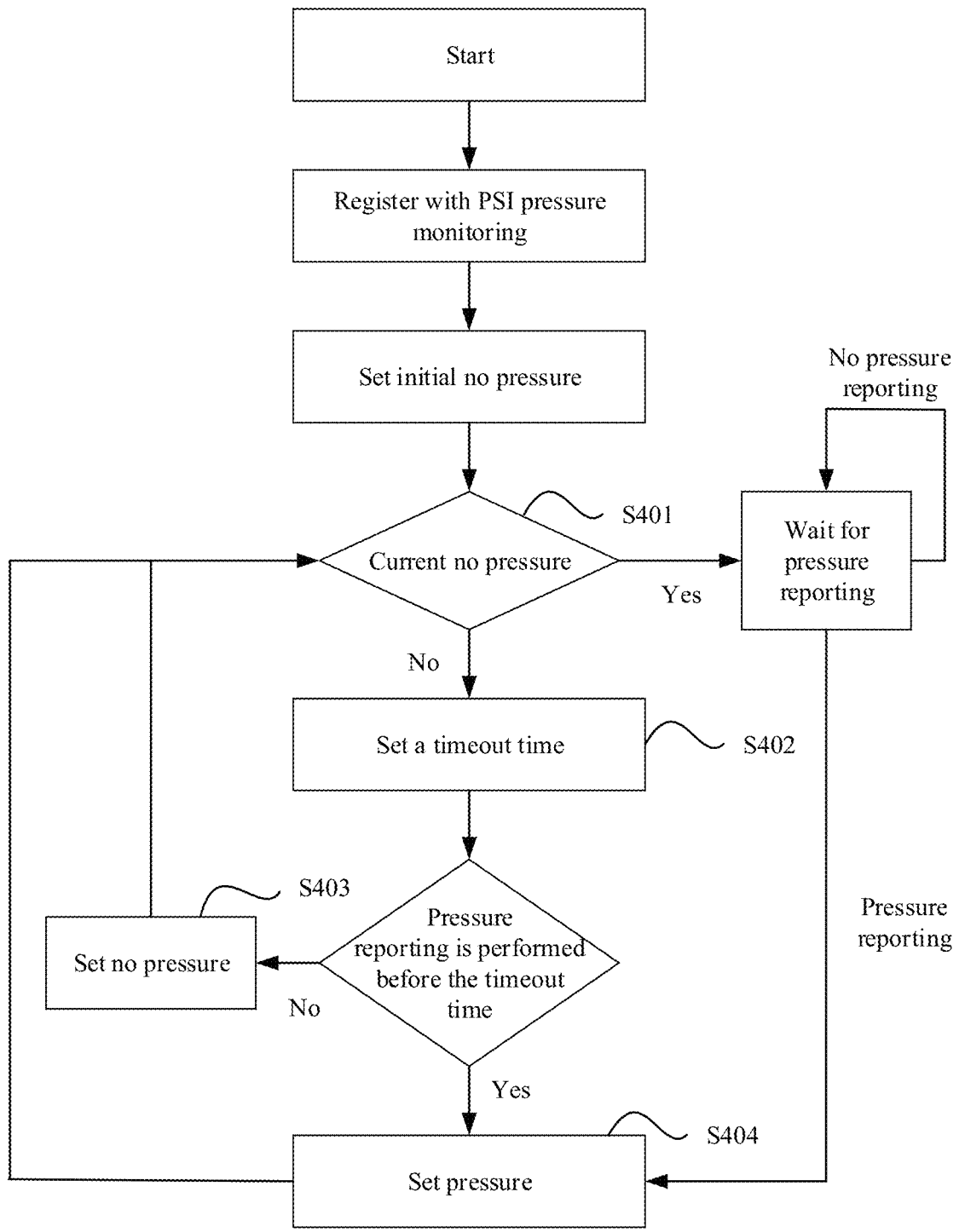
FIG. 4 is a schematic diagram of a working procedure of a PSI pressure registration collection module according to this application.

FIG. 4 is a collection procedure of a single type of PSI.

After the PSI pressure registration collection module starts to work, the PSI pressure registration collection module may register memory pressure monitoring, and set an initial pressure state to no pressure. Subsequently, the PSI pressure registration collection module waits for the kernel to report a pressure event based on an epoll_wait mechanism.

If the current pressure state is no pressure, the PSI pressure registration collection module waits for pressure reporting in a blocking mode. Subsequently, if a pressure event is received during waiting for pressure reporting, the PSI pressure registration collection module sets pressure based on the pressure event. If no pressure event is received during waiting for pressure reporting, the PSI pressure registration collection module continues to wait for a pressure event to be reported.

If the current pressure state is under pressure, the PSI pressure registration collection module may set a timeout time based on a pressure reporting periodicity, and determine whether pressure reporting is performed before the timeout time.

If pressure reporting is performed before the timeout time, the PSI pressure registration collection module may set pressure based on a pressure event. If no pressure reporting is performed before the timeout time, the PSI pressure registration collection module may set the pressure state to no pressure.

It should be noted that "current no pressure" in S401 is determining performed by the PSI pressure registration collection module based on information collected in a previous pressure reporting periodicity, and S403 and S404 are determining performed by the PSI pressure registration collection module based on information collected in a current pressure reporting periodicity.

After S403 or S404 is performed, the PSI pressure registration collection module may repeatedly perform S401.

For a same type of pressure, the PSI pressure registration collection module exposes only pressure with a largest semantic size. For example, when the kernel reports a high pressure event and a low pressure event to the PSI pressure registration collection module, the PSI pressure registration collection module displays only the high pressure event to the system pressure decision module.

If the PSI pressure registration collection module registers with a plurality of types of pressure monitoring, the kernel independently reports an event of each type of pressure. For example, the PSI pressure registration collection module may register with CPU pressure monitoring, memory reclaim pressure monitoring, and I/O pressure monitoring. Subsequently, the kernel separately reports a CPU pressure event, a memory reclaim pressure event, and an I/O pressure event to the PSI pressure registration collection module.

The following describes a specific example in which the PSI pressure registration collection module works.

A 1 s time window is set. In this time window, the kernel keeps counting a time for processing each task by a CPU, a memory reclaim time, and an I/O waiting time.

A processing time of a multi-core CPU is used as an example. After counting the processing time of the multi-core CPU, the kernel may convert the processing time of the multi-core CPU into a processing time of a single-core CPU by using a weighted averaging algorithm.

It may be preset that CPU pressure is low pressure when the processing time reaches 400 ms, the CPU pressure is medium pressure when the processing time reaches 500 ms, and the CPU pressure is high pressure when the processing time reaches 600 ms. When the CPU processing time counted by the kernel is less than 400 ms, the kernel does not report a CPU pressure event. When the CPU processing event counted by the kernel is greater than or equal to 400 ms and less than 500 ms, the kernel reports a CPU low pressure event. When the CPU processing event counted by the kernel is greater than or equal to 500 ms and less than 600 ms, the kernel reports a CPU medium pressure event. When the CPU processing event counted by the kernel is greater than or equal to 600 ms, the kernel reports a CPU high pressure event.

In the foregoing CPU pressure event reporting process, each pressure event is independently reported, that is, the PSI pressure registration collection module may receive a plurality of pressure events in one time window. Semantic sizes of the plurality of pressure events are sorted as follows: High pressure event>medium pressure event>low pressure event>no pressure event. If the PSI pressure registration collection module receives a plurality of pressure events in one time window, the PSI pressure registration collection module needs to display only an event with a largest semantic size to the system pressure decision module.

It should be noted that the no pressure event is not an event reported by the kernel, but an event generated by the PSI pressure registration collection module. When the kernel does not report any pressure event in one time window, the PSI pressure registration collection module generates a no pressure event.

In the processing time counting process, because the time window continuously slides, all information in a next time window needs to be counted again, and the kernel may count a processing time of the next time window according to the following method, so as to improve counting efficiency.

For example, a time window 1 and a time window 2 are two adjacent time windows, and both duration of the time window 1 and duration of the time window 2 are 1s. A CPU processing time of the time window 1 is 800 ms, and a CPU processing time collected by the kernel when the time window 2 reaches 300 ms is 50 ms. In this case, the kernel may predict, according to a formula (1), that a CPU processing time of the time window 2 is 610 ms.

$$T2=(T1/T) \times Tn+Tm \qquad (1).$$

In the formula (1), T2 is a predicted CPU processing time of a current time window, T1 is a CPU processing time of a previous time window, T is duration of a time window, Tn is the remaining duration of the current time window, and Tm is a CPU processing time actually counted in the current time window.

In the foregoing example, T1=800 ms, T=1s, Tn=700 ms, and Tm=50 ms. In this case, these values may be substituted into the formula (1) to obtain T2, that is, 610 ms.

Figure 5:
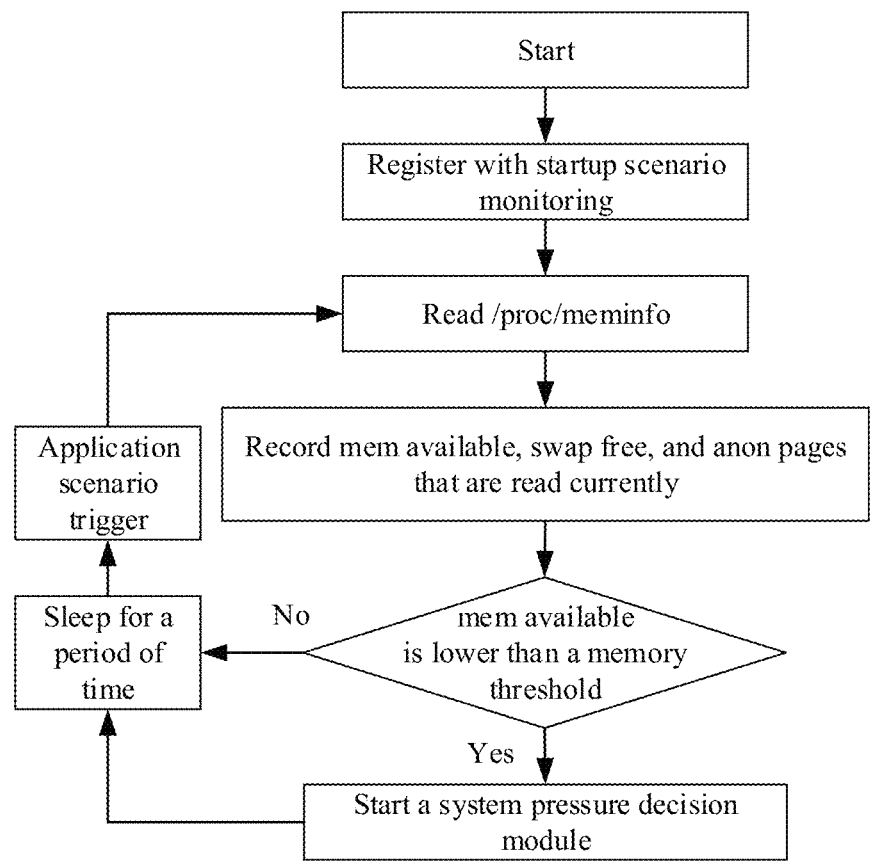
FIG. 5 is a schematic diagram of a working procedure of a memory information collection module according to this application.

FIG. 5 is a schematic diagram of a working procedure of a memory information collection module according to this application.

After the memory information collection module starts to work, the memory information collection module may read/prof/meminfo by using a prof fs file system. Herein, /prof/meminfo is memory information, and/prof/meminfo may include memory available, swap free, and anon pages, where swap free and anon pages are memory information indicating a use frequency of zRAM.

Adjusting a memory configuration parameter consumes operation resources. Therefore, after recording currently read memory information, the memory information collection module may determine, based on memory available, whether to start the system pressure decision module. When memory available is less than a memory threshold, it indicates that there is less available memory. In this case, starting the system pressure decision module can obtain a relatively great benefit, and the system pressure decision module may be started. The following describes in detail a method for adjusting a memory configuration parameter by the system pressure decision module based on information such as swap free and anon pages. When memory available is higher than the memory threshold, it indicates that there is more available memory. In this case, starting the system pressure decision module cannot obtain a relatively great benefit, and the memory information collection module may sleep for a period of time (for example, 2 seconds), and then read/prof/meminfo.

Optionally, the memory information collection module may listen to a registration startup scenario when starting working, and may enter, after a sleep state, a wake-up state under trigger of an application scenario (for example, cold start of an application), and then read/prof/meminfo.

Figure 6:
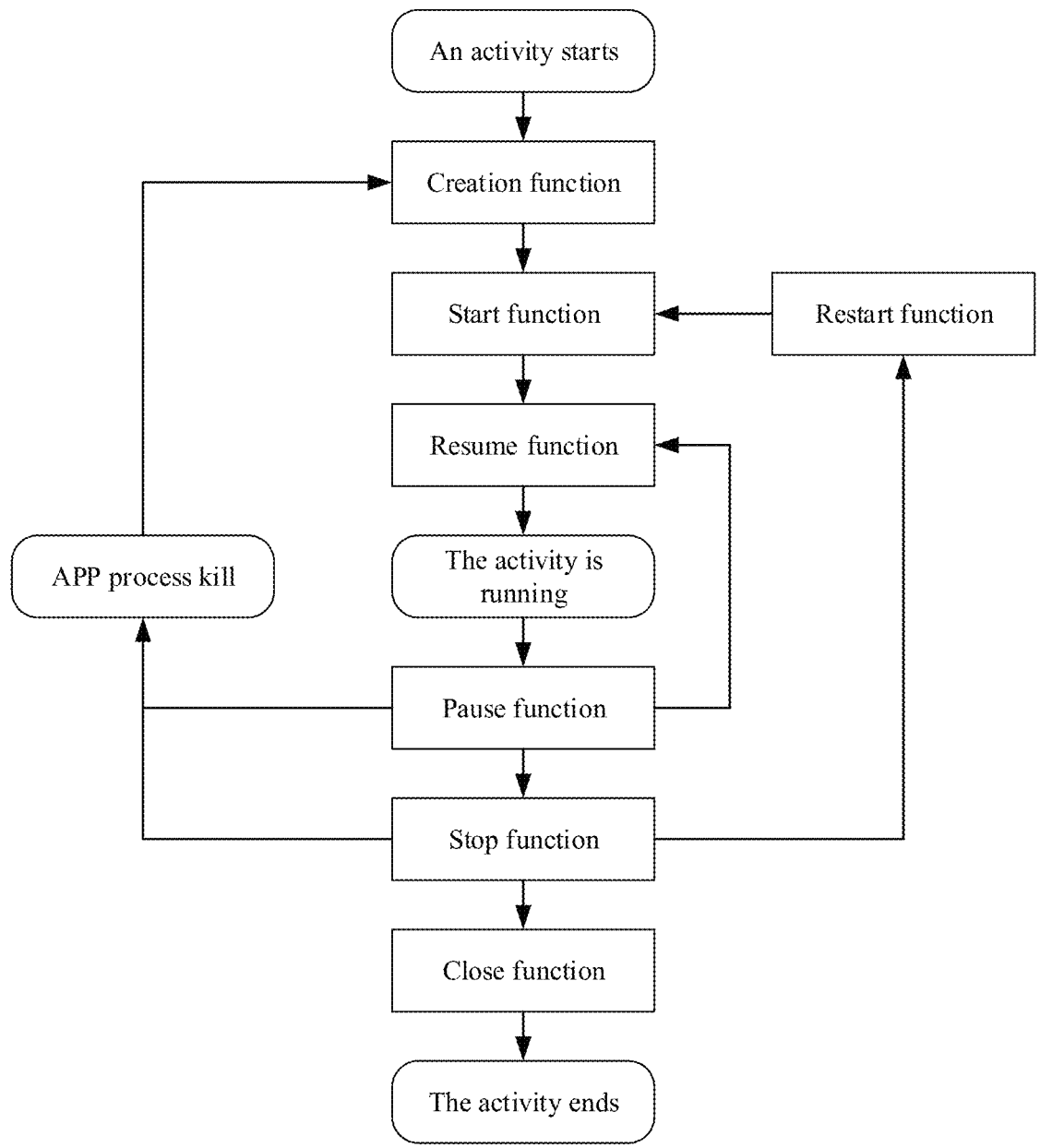
FIG. 6 is a schematic diagram of a working procedure of an application scenario monitoring module according to this application.

FIG. 6 is a schematic diagram of a working procedure of an application scenario monitoring module according to this application.

After an activity is started, the application scenario monitoring module may perform instrumentation before an AMS application lifecycle core callback function, to monitor an application scenario. The foregoing AMS application lifecycle core callback function may include a creation function (onCreate), a start function (onStart), a resume function (onResume), a pause function (onPause), a stop function (onStop), a close function (onDestroy), and a restart function (onRestart) that are shown in FIG. 6. Each function corresponds to one application scenario. By performing instrumentation before these functions, the application scenario monitoring module can obtain various scenario information.

The foregoing describes in detail the working procedures of the PSI pressure registration collection module, the memory information collection module, and the application scenario monitoring module. The following describes in detail a working procedure of the system pressure decision module.

Figure 7:
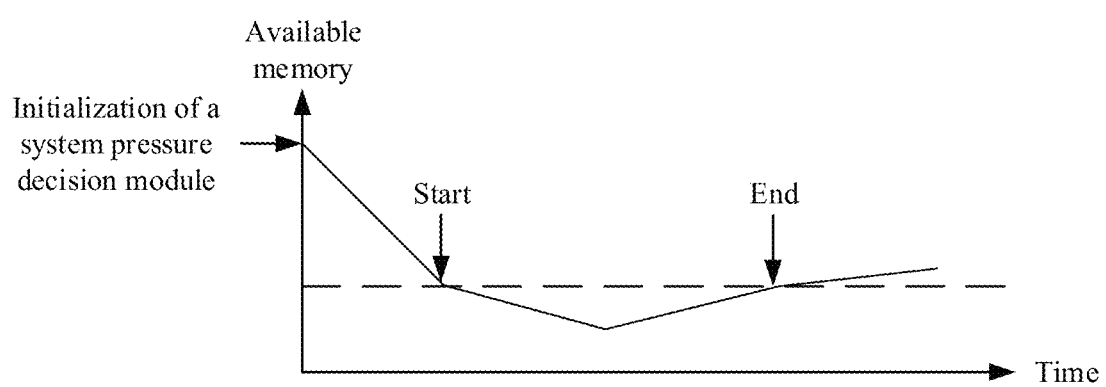
FIG. 7 is a schematic diagram of a working procedure of a system pressure decision module according to this application.

As shown in FIG. 7, after being initialized, the system pressure decision module loads the pressure threshold and the adjustment parameter shown in FIG. 3, and then registers with the PSI pressure registration collection module, the memory information collection module, and the application scenario monitoring module, to separately obtain PSI, memory information, and scenario information from the three modules.

When a value of memavailable is lower than a memavailable watermark (a dashed line in FIG. 7), available memory is in a strained state, and enabling a memory adjustment function by the system pressure decision module can obtain a relatively great system benefit. When the value of memavailable is higher than the memavailable watermark, the available memory is in a loose state, and continuing to adjust memory by the system pressure decision module cannot obtain a great system benefit. In this case, the system pressure decision module may exit the memory adjustment function.

Optionally, a size of a memory threshold may be set based on a size of physical memory. When a physical memory of a terminal device is relatively large, a memory threshold may be set to a relatively low value. When the physical memory of the terminal device is relatively small, the memory threshold may be set to a relatively high value.

For example, if a physical memory of a terminal device A is 12 GB, and a physical memory of a terminal device B is 6 GB, a memavailable watermark of the terminal device A may be set to one third of the physical memory, that is, 4 GB, and a memavailable watermark of the terminal device B may be set to one half of the physical memory, that is, 3 GB. In this way, for a terminal device with a larger physical memory (the terminal device A), fewer operation resources can be consumed for memory adjustment while ensuring sufficient available memory. For a terminal device with a smaller physical memory (the terminal device B), memory adjustment may be performed in advance, to reduce a probability of occurrence of a problem such as memory insufficiency.

Figure 8:
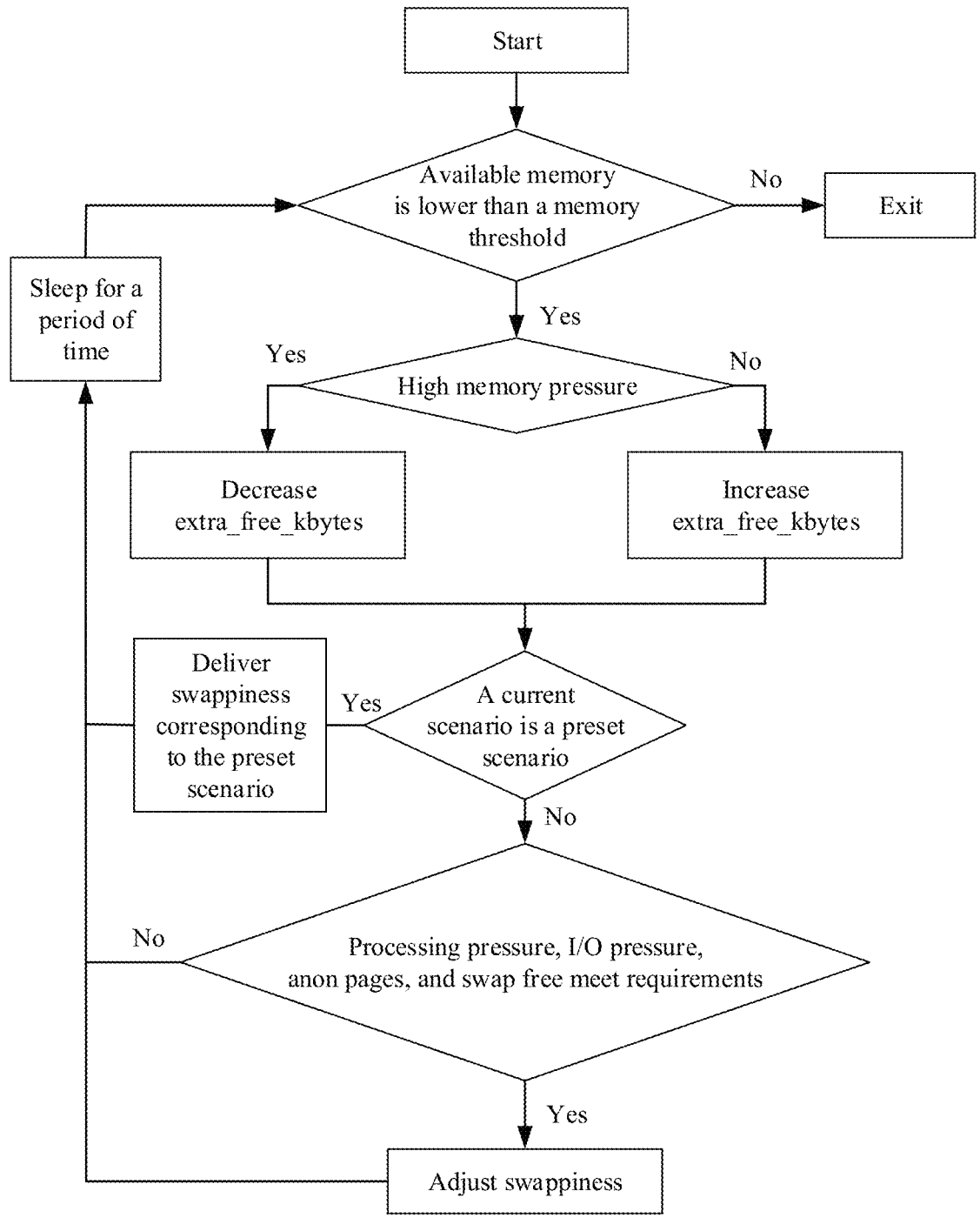
FIG. 8 is a schematic diagram of another working procedure of a system pressure decision module according to this application.

FIG. 8 is a schematic diagram of a working procedure of a system pressure decision module.

After the system pressure decision module starts working (that is, is initialized), if the available memory is less than the memory threshold (that is, a value of memavailable is less than the memavailable watermark), the system pressure decision module determines whether memory pressure is relatively high.

For example, it is assumed that a time required for a memory reclaim task (that is, a time indicated by memory PSI) indicates memory requirement pressure. In this case, when the time required for the memory reclaim task is greater than a third time threshold, it indicates that a quantity of current memory reclaim tasks is relatively large, a memory requirement of a third-party APP is relatively high, and the system pressure decision module may reduce extra_free_kbytes, so that more memory is reserved for the third-party APP. When the time required for the memory reclaim task is less than the third time threshold, it indicates that a quantity of current memory reclaim tasks is relatively small, a memory requirement of a third-party APP is relatively small, and the system pressure decision module may increase extra_free_kbytes, so that more memory is reserved for the kernel.

After adjusting extra_free_kbytes, the system pressure decision module may adjust swappiness.

The system pressure decision module first determines whether a current APP running scenario meets a preset scenario. If the current APP running scenario meets the preset scenario, the system pressure decision module may deliver swappiness corresponding to the preset scenario. For example, if the preset scenario is an application startup scenario, and the current APP running scenario is also an application startup scenario, the system pressure decision module may determine whether the current APP running scenario meets the preset scenario. Various resource requirements of the application startup scenario are relatively fixed. Performing memory adjustment based on preset swappiness can achieve optimal system performance without collecting information such as PSI, swap free, and anon pages for operation, to reduce memory adjustment complexity.

If the current APP running scenario does not meet the preset scenario, the system pressure decision module may adjust swappiness based on information such as PSI, swap free, and anon pages. An adjustment manner is shown in Table 1.

TABLE 1

| I/O PSI | CPU PSI | swap free & anon pages | swappiness |
|---------|---------|------------------------|------------|
| N/A | Low | High | ↑ |
| Low | High | N/A | ↓ |
| Low | N/A | Low | ↓ |
| High | High | N/A | Equilibrium value |
| High | N/A | Low | Equilibrium value |

In Table 1, N/A indicates that the parameter is not currently applicable. The I/O PSI is positively correlated with I/O pressure, and a larger value of the I/O PSI indicates a larger value of the I/O pressure. The CPU PSI is positively correlated with operation pressure, and a larger value of the CPU PSI indicates a larger value of the operation pressure.

For a determining manner of the first row in Table 1, when a processing time (a time indicated by the CPU PSI) is less than a second time threshold, it indicates that the operation pressure is relatively low, and a use frequency of zRAM may be increased to obtain more available memory. When swap free is relatively high and anon pages is relatively high, a use benefit of zRAM is relatively great, and a use frequency of zRAM may be increased. In comprehensive consideration of the CPU PSI, anon pages, and swap free, a value of swappiness may be increased to increase a use frequency of zRAM, to achieve optimal system performance and improve a memory management effect.

For a determining manner of the second row in Table 1, when a processing time (a time indicated by the CPU PSI) is greater than a second time threshold, it indicates that the operation pressure is relatively large, and a use frequency of zRAM may be reduced to reduce an operation resource requirement. When an I/O time (a time indicated by the I/O PSI) is less than a first time threshold, it indicates that the current I/O pressure is relatively low, a memory requirement is relatively small, and a use frequency of zRAM may be reduced. In comprehensive consideration of the I/O PSI and the CPU PSI, a value of swappiness may be reduced to reduce a use frequency of zRAM, to achieve optimal system performance and improve a memory management effect.

For a determining manner of the third row in Table 1, when an I/O time (a time indicated by the I/O PSI) is less than a first time threshold, it indicates that the current I/O pressure is relatively low, a memory requirement is relatively low, and a use frequency of zRAM may be reduced. When swap free is relatively low and anon pages is relatively low, a use benefit of zRAM is relatively low, and a use frequency of zRAM may be reduced. In comprehensive consideration of the I/O PSI, anon pages, and swap free, a value of swappiness may be reduced to reduce a use frequency of zRAM, to achieve optimal system performance and improve a memory management effect.

For a determining manner of the fourth row in Table 1, when a processing time (a time indicated by the CPU PSI) is greater than a second time threshold, it indicates that the operation pressure is relatively high, and a use frequency of zRAM may be reduced to reduce an operation resource requirement. When an I/O time (a time indicated by the I/O PSI) is greater than a first time threshold, it indicates that the current I/O pressure is relatively high, a memory requirement is relatively high, and a use frequency of zRAM needs to be increased to obtain more available memory. In comprehensive consideration of the I/O PSI and the CPU PSI, swappiness may be set to a proper value (for example, a preset equilibrium value) to balance a resource requirement and a memory requirement, to achieve optimal system performance and improve a memory management effect.

For a determining manner of the fifth row in Table 1, when an I/O time (a time indicated by the I/O PSI) is greater than a first time threshold, it indicates that the current I/O pressure is relatively high, a memory requirement is relatively high, and a use frequency of zRAM needs to be increased. When swap free is relatively low and anon pages is relatively low, a use benefit of zRAM is relatively low, and a use frequency of zRAM needs to be reduced. In comprehensive consideration of the I/O PSI, swap free, and anon pages, swappiness may be set to a proper value (for example, a preset equilibrium value) to balance a memory requirement and a use benefit of zRAM, to achieve optimal system performance and improve a memory management effect.

The foregoing five adjustment manners of swappiness are some embodiments provided in this application. Based on the foregoing adjustment idea, more adjustment manners may be extended. No enumeration is provided in this appli-cation. In addition, the first time threshold and the second time threshold may be preset values, which are shown in the threshold obtained by the system pressure decision module in FIG. 3.

If the PSI, swap free, and anon pages that are obtained by the system pressure decision module do not meet the condition shown in Table 1, the system pressure decision module may not adjust swappiness. Regardless of whether swappiness is adjusted, the system pressure decision module may sleep for a period of time after performing determining processing according to Table 1, to consume fewer operation resources and fewer memory resources.

After the foregoing method is applied to a mobile phone of Huawei with internal memory of 2 GB and a system of EMUI11.0 lite, a start time of a camera APP in a case of a high system load (for example, in a case of continuously starting 30 APPs) is reduced by 50 ms compared with a start time of the mobile phone to which the foregoing method is not applied, and available memory is increased by 80 MB.

In the foregoing embodiment, the system pressure decision module first adjusts extra_free_kbytes, and then adjusts swappiness. In a process of adjusting swappiness, the system pressure decision module first adjusts swappiness based on an application scenario, and then adjusts swappiness based on the PSI, swap free, and anon pages. It should be noted that a sequence of these adjustment steps may be exchanged. This is not limited in this application.

For example, the system pressure decision module may adjust swappiness before extra_free_kbytes. In a process of adjusting swappiness, the system pressure decision module may first adjust swappiness based on the PSI, swap free, and anon pages, and then adjust swappiness based on the application scenario.

The foregoing describes in detail an example of the memory adjustment method provided in this application. It may be understood that, to implement the foregoing functions, the corresponding apparatus includes a hardware structure and/or a software module that execute each function. A person skilled in the art should easily aware that, with reference to the units and algorithm steps of the examples described in embodiments disclosed in this specification, this application can be implemented in a form of hardware or a combination of hardware and computer software. Whether a function is executed in a hardware or computer software-driven hardware manner depends on a specific application and design constraint condition of a technical solution. A person skilled in the art may use different methods for each specific application to implement the described functions, but this implementation should not be considered to be beyond the scope of this application.

In this application, the memory adjustment apparatus may be divided into function units according to the foregoing method example. For example, each function may be divided into function units, or two or more functions may be integrated into one unit. The foregoing integrated unit may be implemented in a form of hardware, or may be implemented in a form of a software function unit. It should be noted that unit division in this application is an example, and is merely logical function division. In actual implementation, there may be another division manner.

Figure 9:
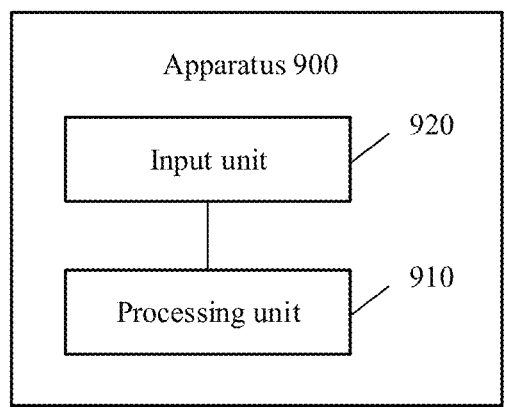
FIG. 9 is a schematic diagram of a memory adjustment apparatus according to this application.

FIG. 9 is a schematic diagram of a structure of a memory adjustment apparatus according to this application. The apparatus 900 includes a processing unit 910 and an input unit 920, and the input unit 920 can perform an obtaining step under control of the processing unit 910. For example, the input unit 920 is configured to obtain a plurality of pieces of resource pressure, where the plurality of pieces of resource pressure are used to indicate a plurality of requirements for memory compression.

The processing unit 910 is configured to adjust a memory configuration parameter based on the plurality of pieces of resource pressure, where there is a preset correspondence between the memory configuration parameter and each of the plurality of pieces of resource pressure.

Optionally, the memory configuration parameter includes a memory swap parameter, and the plurality of pieces of resource pressure include input/output pressure and memory swap space pressure. The processing unit 910 is specifically configured to: reduce the memory swap parameter when the input/output pressure decreases and the memory swap space pressure decreases; or adjust the memory swap parameter to a preset value when the input/output pressure increases and the memory swap space pressure decreases.

Optionally, the memory configuration parameter includes a memory swap parameter, and the plurality of pieces of resource pressure include processor pressure and memory swap space pressure. The processing unit 910 is specifically configured to increase the memory swap parameter when the processor pressure decreases and the memory swap space pressure increases.

Optionally, a size of the memory swap space pressure is positively correlated with a quantity of anonymous pages.

Optionally, the size of the memory swap space pressure is positively correlated with a size of available swap space.

Optionally, the memory configuration parameter includes a memory swap parameter, and the plurality of pieces of resource pressure include processor pressure and input/output pressure. The processing unit 910 is specifically configured to reduce the memory swap parameter when the input/output pressure decreases and the processor pressure increases; or adjust the memory swap parameter to a preset value when the input/output pressure increases and the processor pressure increases.

Optionally, the processing unit 910 is specifically configured to: when a current application running scenario indicated by scenario information does not meet a preset scenario, adjust the memory configuration parameter based on the plurality of pieces of resource pressure.

Optionally, the processing unit 910 is further configured to: reduce an extra free memory configuration parameter when memory reclaim pressure increases; or increase the extra free memory configuration parameter when the memory reclaim pressure decreases.

Optionally, the processing unit 910 is specifically configured to: when available memory is less than a memory threshold, adjust the memory configuration parameter based on the plurality of pieces of resource pressure.

For a specific manner in which the apparatus 900 performs the memory adjustment method and generated beneficial effects, refer to related descriptions in the method embodiments.

Figure 10:
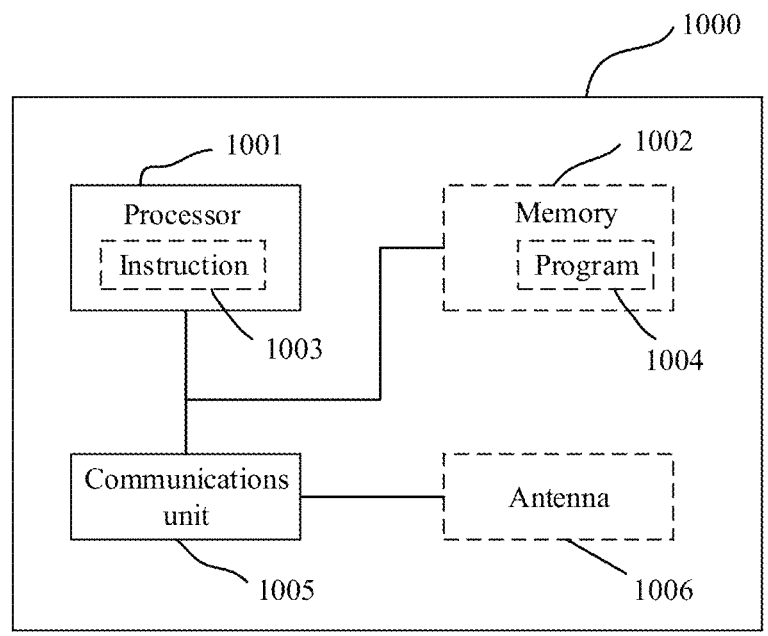
FIG. 10 is a schematic diagram of an electronic device for adjusting a memory according to this application.

FIG. 10 is a schematic diagram of a structure of an electronic device according to this application. A dashed line in FIG. 10 indicates that the unit or the module is optional. The device 1000 may be configured to implement the method described in the foregoing method embodiments. The device 1000 may be a terminal device, a server, or a chip.

The device 1000 includes one or more processors 1001, and the one or more processors 1001 may support the device 1000 in implementing the method in the method embodiments. The processor 1001 may be a general-purpose processor or a dedicated processor. For example, the processor 1001 may be a central processing unit (central processing unit, CPU), a digital signal processor (digital signal processor, DSP), an application-specific integrated circuit (application specific integrated circuit, ASIC), a field programmable gate array (field programmable gate array, FPGA), or another programmable logic device such as a discrete gate, a transistor logic device, or a discrete hardware component.

The processor 1001 may be configured to control the device 1000, execute a software program, and process data of the software program. The device 1000 may further include a communications unit 1005, configured to implement input (receiving) and output (transmission) of a signal.

For example, the device 1000 may be a chip, the communications unit 1005 may be an input and/or an output circuit of the chip, or the communications unit 1005 may be a communications interface of the chip, and the chip may be used as a terminal device, a server, or another electronic device.

For another example, the device 1000 may be a terminal device or a server, and the communications unit 1005 may be a transceiver of the terminal device or the server, or the communications unit 1005 may be a transceiver circuit of the terminal device or the server.

The device 1000 may include one or more memories 1002, storing a program 1004. The program 1004 may be run by the processor 1001 to generate instructions 1003, so that the processor 1001 performs the method described in the foregoing method embodiments according to the instructions 1003. Optionally, the memory 1002 may further store data. Optionally, the processor 1001 may further read data (as shown in Table 1) stored in the memory 1002. The data may be stored in a same storage address as the program 1004, or the data may be stored in different storage addresses from the program 1004.

The processor 1001 and the memory 1002 may be disposed separately, or may be integrated together, for example, integrated into a system on chip (system on chip, SOC) of a terminal device.

The device 1000 may further include an antenna 1006. The communications unit 1005 is configured to implement a transceiver function of the device 1000 by using the antenna 1006.

This application further provides a computer program product, and the computer program product is executed by the processor 1001 to implement the method in any method embodiment of this application.

The computer program product may be stored in the memory 1002, for example, the program 1004. The program 1004 is finally converted into an executable target file that can be executed by the processor 1001 by using a processing process such as preprocessing, compilation, assembly, and link.

This application further provides a computer-readable storage medium, storing a computer program, and the computer program is executed by a computer to implement the method in any method embodiment of this application. The computer program may be a high-level language program, or may be an executable target program.

For example, the computer-readable storage medium is the memory 1002. The memory 1002 may be a volatile memory or a nonvolatile memory, or the memory 1002 may include both a volatile memory and a nonvolatile memory. The nonvolatile memory may be a read-only memory (read-only memory, ROM), a programmable ROM (programmable ROM, PROM), an erasable PROM (erasable PROM, EPROM), an electrically EPROM (electrically EPROM, EEPROM), or a flash memory. The volatile memory may be a random access memory (RAM) that serves as an external cache. By way of example but not of limitation, many forms of RAMs are available, such as a static RAM (static RAM, SRAM), a dynamic RAM (dynamic RAM, DRAM), a synchronous DRAM (synchronous DRAM, SDRAM), a double data rate SDRAM (double data rate SDRAM, DDR SDRAM), an enhanced SDRAM (enhanced SDRAM, ESDRAM), a synchlink DRAM (synchlink DRAM, SLDRAM), and a direct rambus RAM (direct rambus RAM, DR RAM).

It may be clearly understood by a person skilled in the art that, for convenience and brevity of description, for specific working processes and technical effects of the foregoing apparatus and device, refer to corresponding processes and technical effects in the foregoing method embodiments. Details are not described herein again.

In the several embodiments provided in this application, the disclosed system, apparatus, and method may be implemented in another manner. For example, some features of the method embodiments described above may be ignored or not performed. The described apparatus embodiment is merely an example, and unit division is merely logical function division. In actual implementation, there may be another division manner. A plurality of units or components may be combined or integrated into another system. In addition, coupling between units or coupling between components may be direct coupling, or may be indirect coupling. The coupling includes an electrical connection, a mechanical connection, or another form of connection.

It should be understood that in various embodiments of this application, a sequence number of each process does not mean a sequence of execution. The sequence of execution of each process should be determined according to a function and internal logic of the process, and should not constitute any limitation on an implementation process of the embodiments of this application.

In addition, the terms "system" and "network" are often used interchangeably in this specification. The term "and/or" in this specification is merely an association relationship for describing associated objects, and indicates that three relationships may exist. For example, A and/or B may indicate the following three cases: Only A exists, both A and B exist, and only B exists. In addition, the character "/" in this specification generally indicates that there is an "or" relationship between the associated objects.

In conclusion, the foregoing descriptions are merely preferred embodiments of the technical solutions of this application, and are not intended to limit the protection scope of this application. Any modification, equivalent replacement, improvement, or the like made within the spirit and principle of this application shall be included in the protection scope of this application.

What is claimed is:

1. A method for adjusting a memory configuration parameter, comprising:
    obtaining a plurality of pieces of resource pressure, wherein the plurality of pieces of resource pressure are used to indicate a plurality of requirements for memory compression; and
    adjusting a memory configuration parameter based on the plurality of pieces of resource pressure;
    when the memory configuration parameter comprises a memory swap parameter, and the plurality of pieces of resource pressure comprise input/output pressure and memory swap space pressure,
    the adjusting a memory configuration parameter based on the plurality of pieces of resource pressure comprises:
        reducing the memory swap parameter when the input/output pressure decreases and the memory swap space pressure decreases; or
        adjusting the memory swap parameter to a preset value when the input/output pressure increases and the memory swap space pressure decreases.

2. The method according to claim 1, wherein the memory configuration parameter comprises a memory swap parameter, and the plurality of pieces of resource pressure comprise processor pressure and memory swap space pressure; and
    the adjusting a memory configuration parameter based on the plurality of pieces of resource pressure comprises:
        increasing the memory swap parameter when the processor pressure decreases and the memory swap space pressure increases.

3. The method according to claim 1, wherein a size of the memory swap space pressure is positively correlated with a quantity of anonymous pages.

4. The method according to claim 1, wherein the size of the memory swap space pressure is positively correlated with a size of available swap space.

5. The method according to claim 1, wherein the memory configuration parameter comprises a memory swap parameter, and the plurality of pieces of resource pressure comprise processor pressure and input/output pressure; and
    the adjusting a memory configuration parameter based on the plurality of pieces of resource pressure comprises:
        reducing the memory swap parameter when the input/output pressure decreases and the processor pressure increases; or
        adjusting the memory swap parameter to a preset value when the input/output pressure increases and the processor pressure increases.

6. The method according to claim 1, wherein the adjusting a memory configuration parameter based on the plurality of pieces of resource pressure comprises:
    when a current application running scenario indicated by scenario information does not meet a preset scenario, adjusting the memory configuration parameter based on the plurality of pieces of resource pressure.

7. The method according to claim 6, further comprising:
    reducing an extra free memory configuration parameter when memory reclaim pressure increases; or
    increasing the extra free memory configuration parameter when the memory reclaim pressure decreases.

8. The method according to claim 1, wherein the adjusting a memory configuration parameter based on the plurality of pieces of resource pressure comprises:
    when available memory is less than a memory threshold, adjusting the memory configuration parameter based on the plurality of pieces of resource pressure.

9. The method according to claim 8, wherein a ratio of the memory threshold to a physical memory is negatively correlated with a size of the physical memory.

10. An electronic device for adjusting a memory configuration parameter, comprising a processor and a memory, wherein the processor and the memory are coupled, the memory is configured to store a computer program, and when the computer program is executed by the processor, the apparatus is enabled to perform the following operations:
    obtaining a plurality of pieces of resource pressure, wherein the plurality of pieces of resource pressure are used to indicate a plurality of requirements for memory compression; and
    adjusting a memory configuration parameter based on the plurality of pieces of resource pressure;

when the memory configuration parameter comprises a memory swap parameter, and the plurality of pieces of resource pressure comprise input/output pressure and memory swap space pressure, the adjusting a memory configuration parameter based on the plurality of pieces of resource pressure comprises:

reducing the memory swap parameter when the input/output pressure decreases and the memory swap space pressure decreases; or adjusting the memory swap parameter to a preset value when the input/output pressure increases and the memory swap space pressure decreases.

11. The electronic device according to claim 10, wherein the memory configuration parameter comprises a memory swap parameter, and the plurality of pieces of resource pressure comprise processor pressure and memory swap space pressure; and the adjusting a memory configuration parameter based on the plurality of pieces of resource pressure comprises:

increasing the memory swap parameter when the processor pressure decreases and the memory swap space pressure increases.

12. The electronic device according to claim 10, wherein a size of the memory swap space pressure is positively correlated with a quantity of anonymous pages.

13. The electronic device according to claim 10, wherein the size of the memory swap space pressure is positively correlated with a size of available swap space.

14. The electronic device according to claim 10, wherein the memory configuration parameter comprises a memory swap parameter, and the plurality of pieces of resource pressure comprise processor pressure and input/output pressure; and the adjusting a memory configuration parameter based on the plurality of pieces of resource pressure comprises:

reducing the memory swap parameter when the input/output pressure decreases and the processor pressure increases; or adjusting the memory swap parameter to a preset value when the input/output pressure increases and the processor pressure increases.

15. The electronic device according to claim 10, wherein the adjusting a memory configuration parameter based on the plurality of pieces of resource pressure comprises:

when a current application running scenario indicated by scenario information does not meet a preset scenario, adjusting the memory configuration parameter based on the plurality of pieces of resource pressure.

16. The electronic device according to claim 15, wherein the operations further comprise:

reducing an extra free memory configuration parameter when memory reclaim pressure increases; or increasing the extra free memory configuration parameter when the memory reclaim pressure decreases.

17. The electronic device according to claim 10, wherein the adjusting a memory configuration parameter based on the plurality of pieces of resource pressure comprises:

when available memory is less than a memory threshold, adjusting the memory configuration parameter based on the plurality of pieces of resource pressure.

18. The electronic device according to claim 17, wherein a ratio of the memory threshold to a physical memory is negatively correlated with a size of the physical memory.

19. A non-transitory computer-readable storage medium, wherein the computer-readable storage medium stores a computer program, and when the computer program is executed by a processor, the processor is enabled to perform the following operations:

obtaining a plurality of pieces of resource pressure, wherein the plurality of pieces of resource pressure are used to indicate a plurality of requirements for memory compression; and adjusting a memory configuration parameter based on the plurality of pieces of resource pressure;

when the memory configuration parameter comprises a memory swap parameter, and the plurality of pieces of resource pressure comprise input/output pressure and memory swap space pressure, the adjusting a memory configuration parameter based on the plurality of pieces of resource pressure comprises:

reducing the memory swap parameter when the input/output pressure decreases and the memory swap space pressure decreases; or adjusting the memory swap parameter to a preset value when the input/output pressure increases and the memory swap space pressure decreases.

* * * * *